Figure 4:
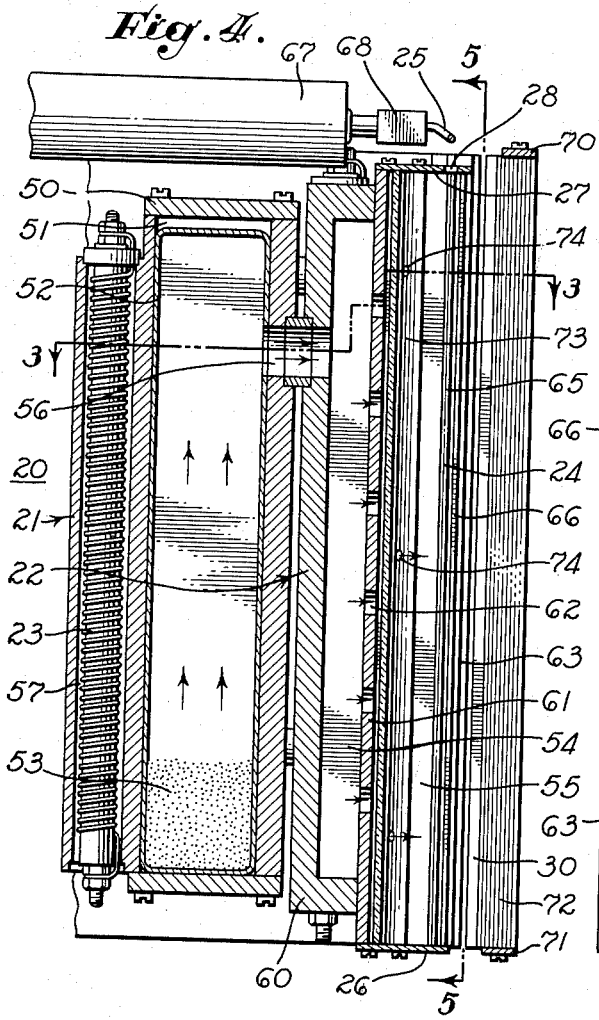

Aug. 2, 1955     E. O. LAWRENCE     2,714,664
CALUTRONS
Filed May 19, 1944     11 Sheets-Sheet 1
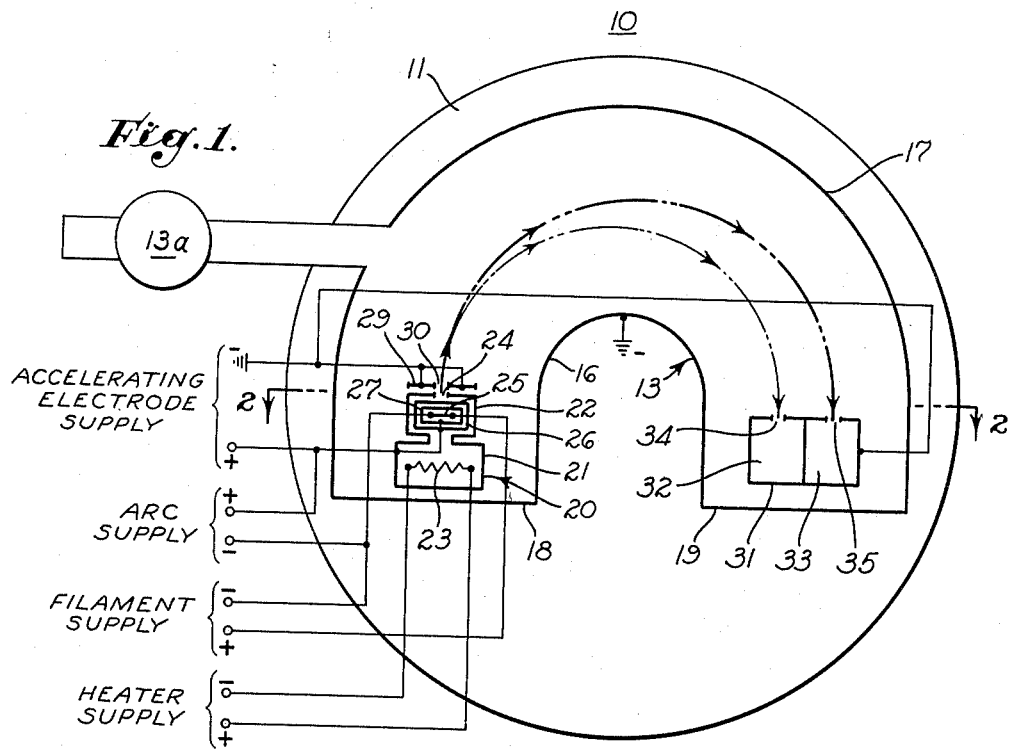
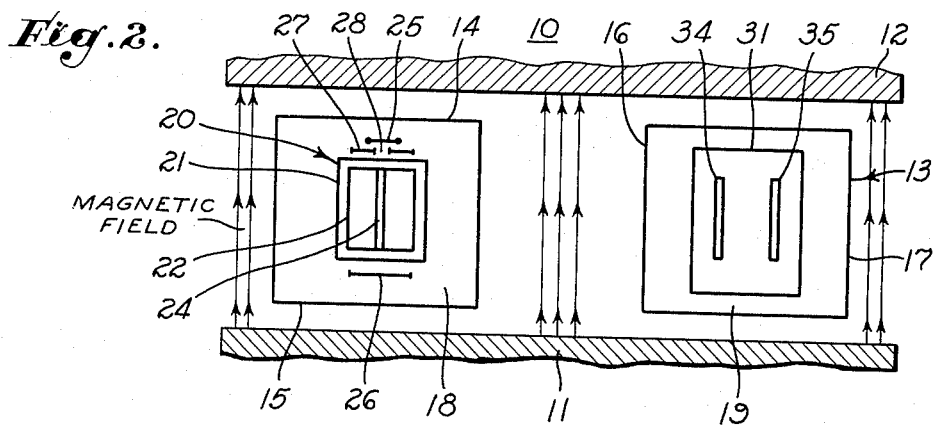
INVENTOR.
ERNEST O. LAWRENCE
BY
ATTORNEY.

Aug. 2, 1955

E. O. LAWRENCE 2,714,664

CALUTRONS

Filed May 19, 1944

11 Sheets-Sheet 2

INVENTOR.
ERNEST O. LAWRENCE
BY Robert A. Lavender
ATTORNEY.

Aug. 2, 1955  E. O. LAWRENCE  2,714,664
CALUTRONS
Filed May 19, 1944  11 Sheets-Sheet 3

INVENTOR.
ERNEST O. LAWRENCE
BY
ATTORNEY.

Aug. 2, 1955 E. O. LAWRENCE 2,714,664
CALUTRONS
Filed May 19, 1944 11 Sheets-Sheet 4
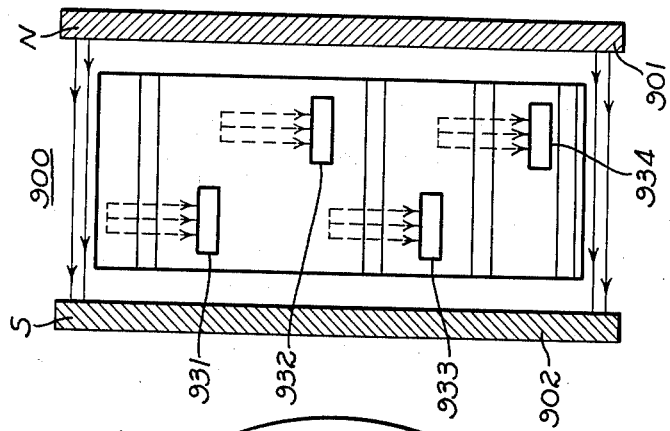
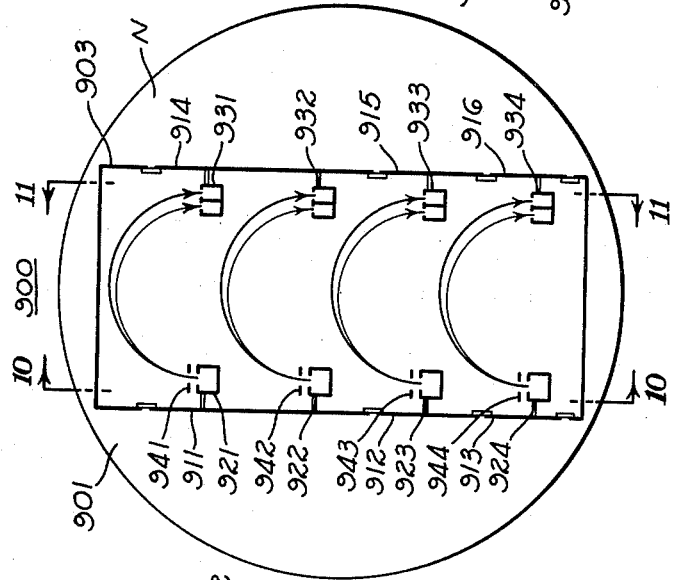
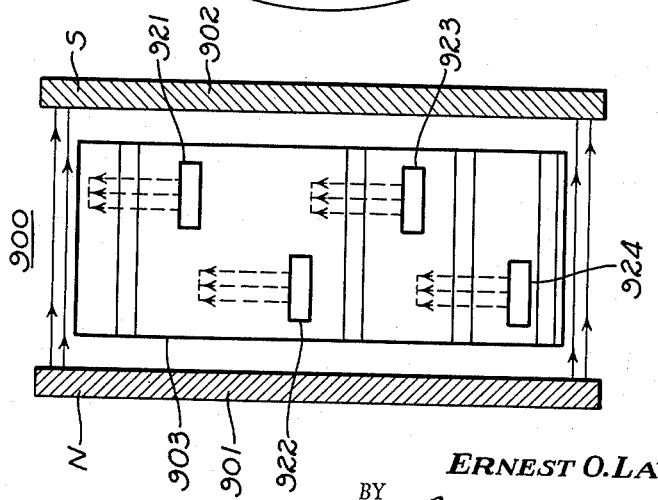
INVENTOR.
ERNEST O. LAWRENCE
BY
ATTORNEY.

Aug. 2, 1955
E. O. LAWRENCE
2,714,664
CALUTRONS
Filed May 19, 1944
11 Sheets-Sheet 5
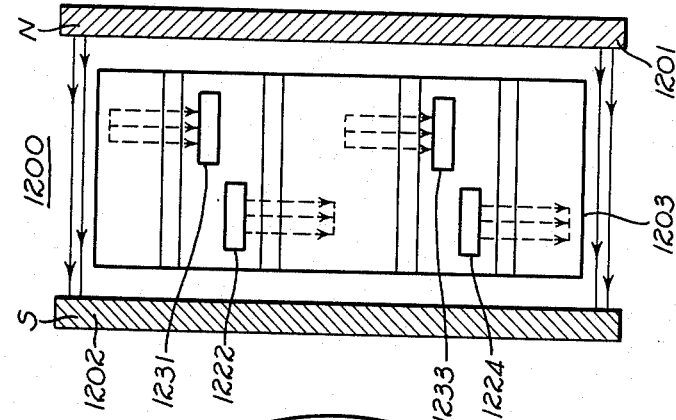
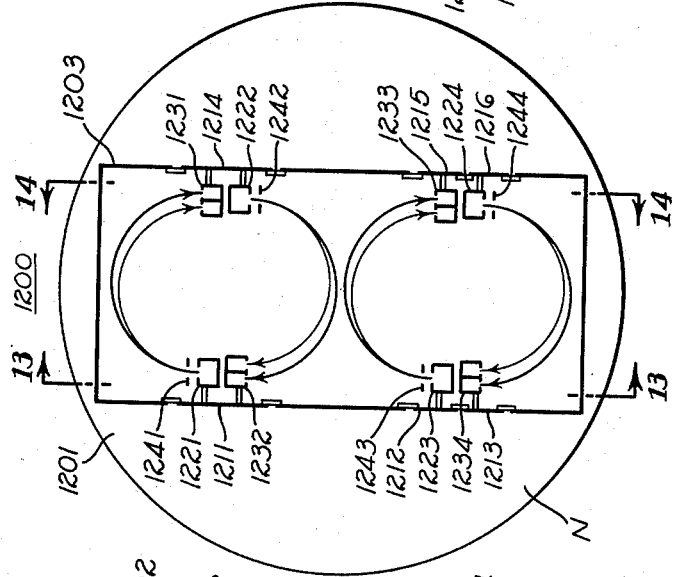
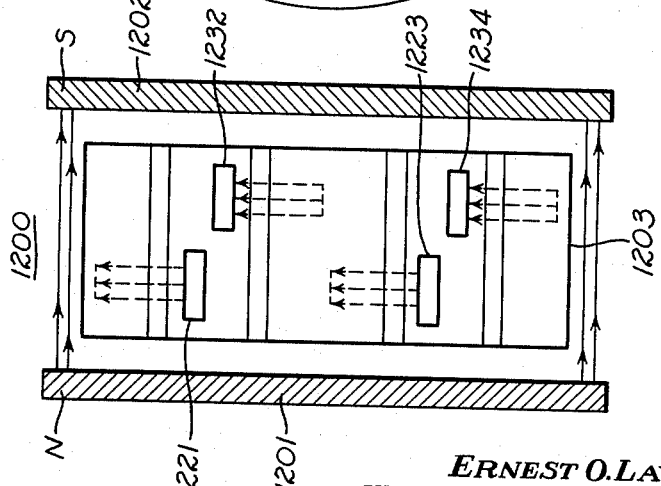
INVENTOR.
ERNEST O. LAWRENCE
BY
ATTORNEY.

Aug. 2, 1955

E. O. LAWRENCE 2,714,664

CALUTRONS

Filed May 19, 1944

11 Sheets-Sheet 6

INVENTOR.
ERNEST O. LAWRENCE
BY
ATTORNEY.

Aug. 2, 1955          E. O. LAWRENCE          2,714,664
                         CALUTRONS
Filed May 19, 1944                         11 Sheets-Sheet 7
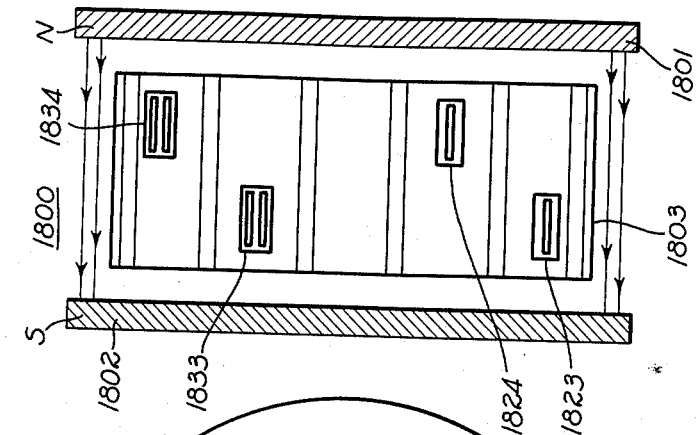
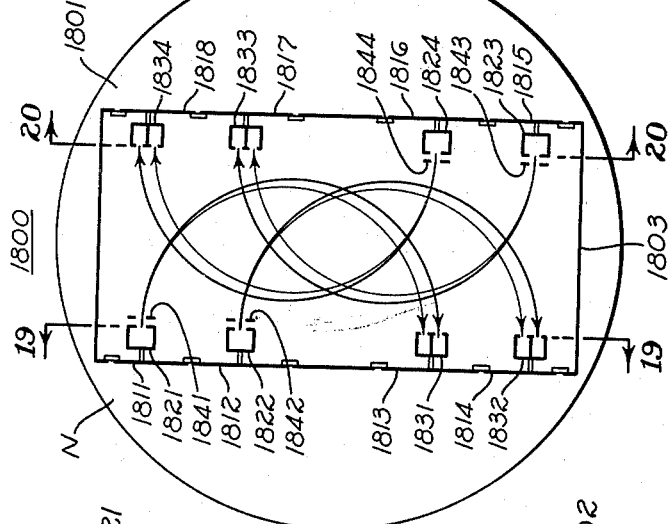
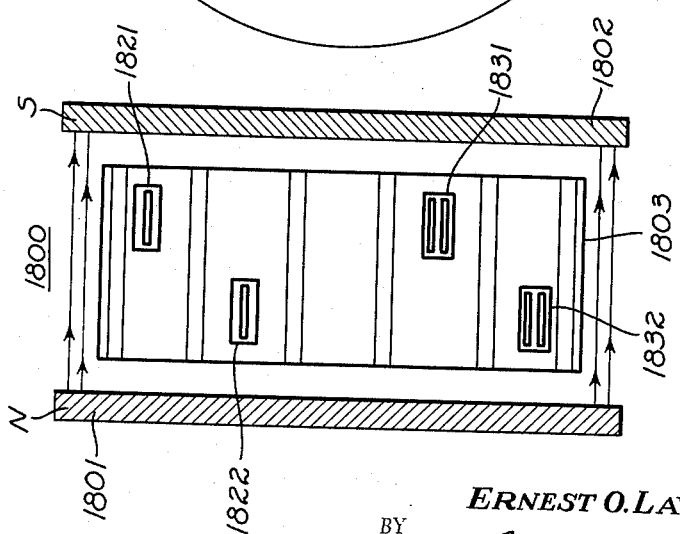
INVENTOR.
ERNEST O. LAWRENCE
BY
ATTORNEY.

Aug. 2, 1955 E. O. LAWRENCE 2,714,664
CALUTRONS
Filed May 19, 1944 11 Sheets-Sheet 8
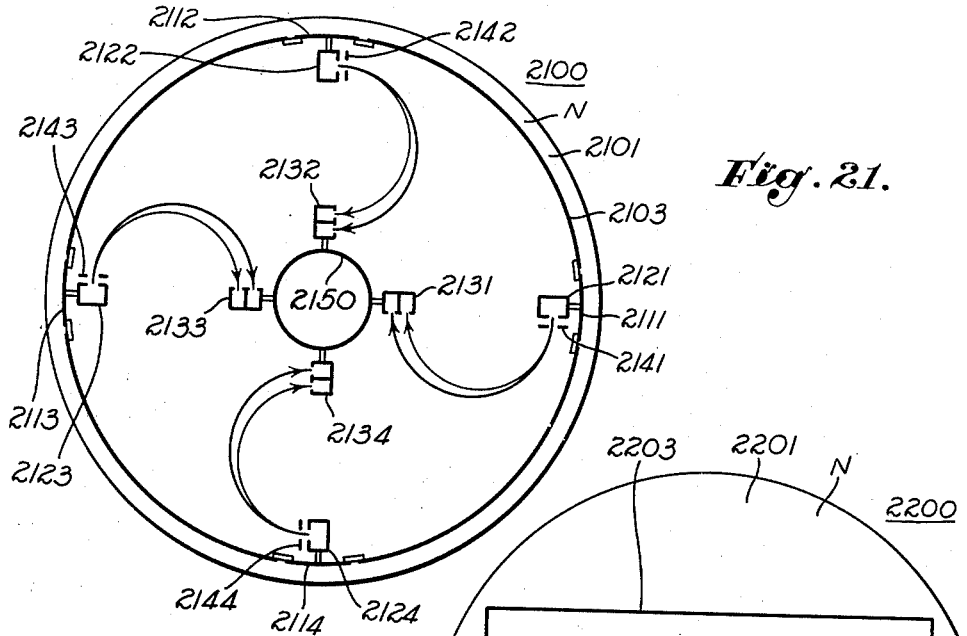
Fig. 21.
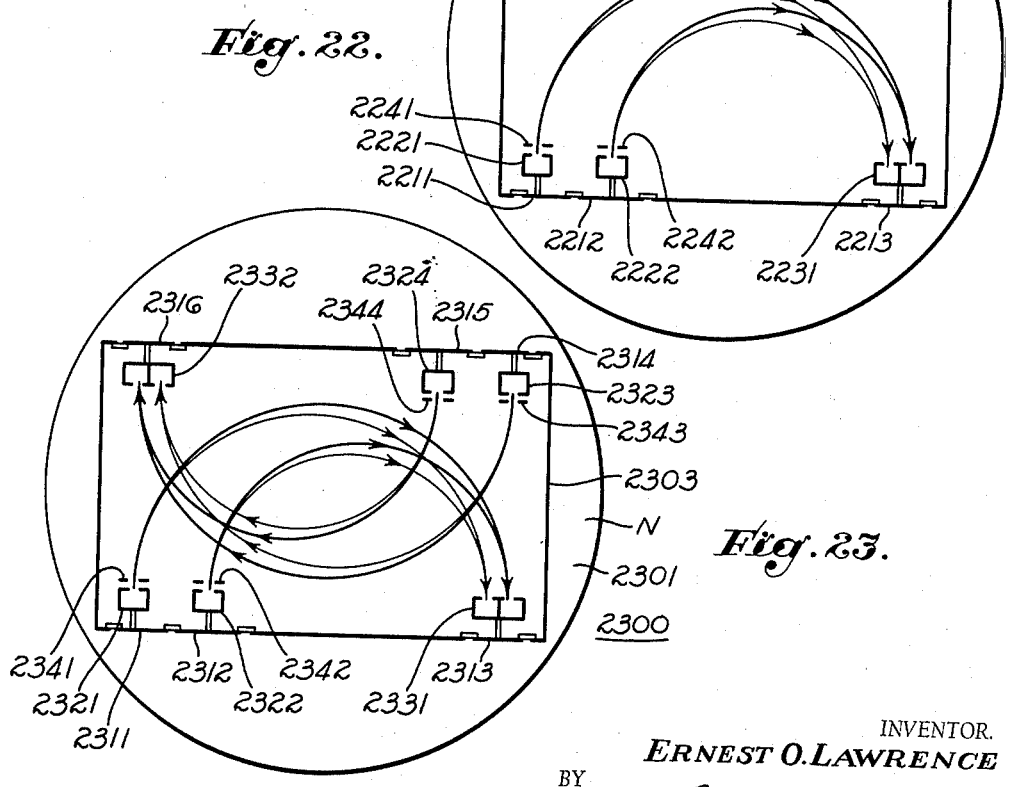
Fig. 22.
Fig. 23.
INVENTOR.
ERNEST O. LAWRENCE
BY
ATTORNEY.

Aug. 2, 1955
E. O. LAWRENCE
2,714,664
CALUTRONS
Filed May 19, 1944
11 Sheets-Sheet 9
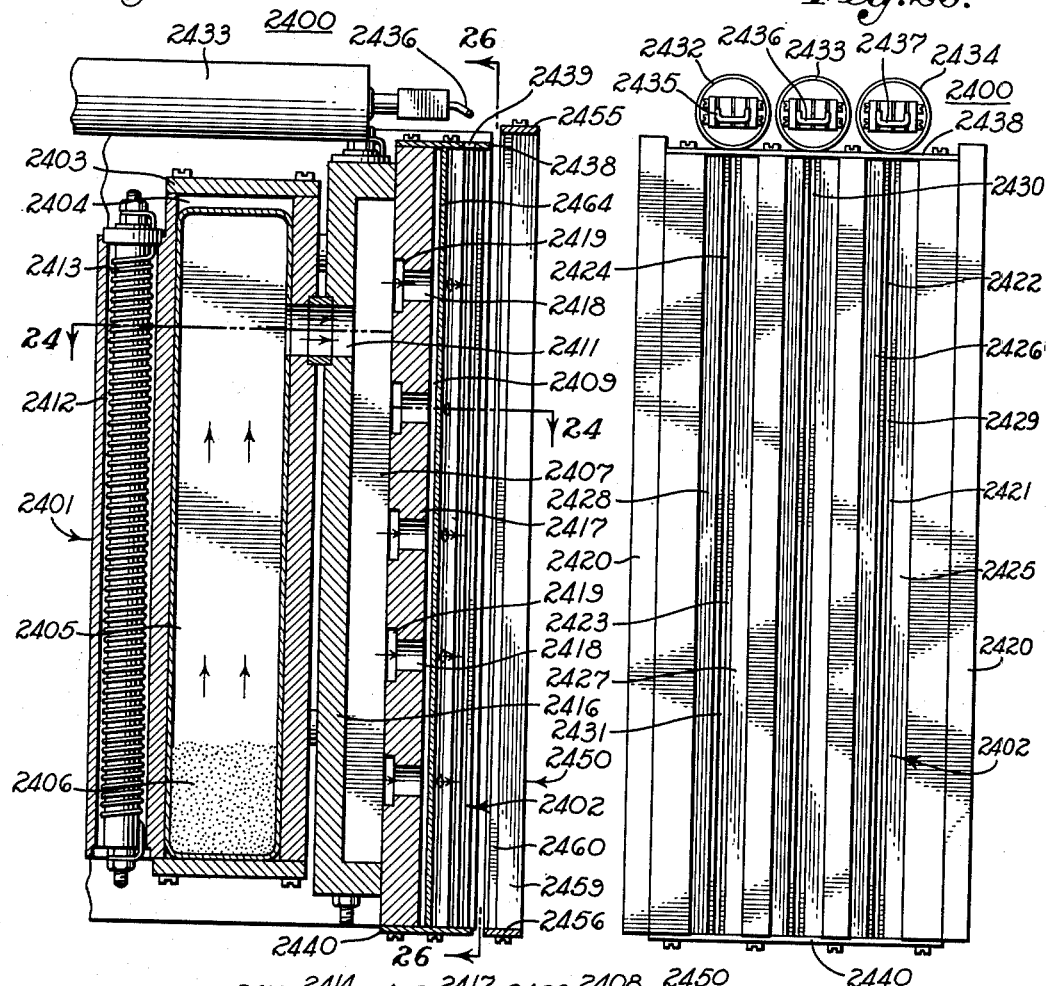
INVENTOR.
ERNEST O. LAWRENCE
ATTORNEY.

Aug. 2, 1955

E. O. LAWRENCE 2,714,664

CALUTRONS

Filed May 19, 1944

11 Sheets-Sheet 10

INVENTOR.
ERNEST O. LAWRENCE
BY
ATTORNEY.

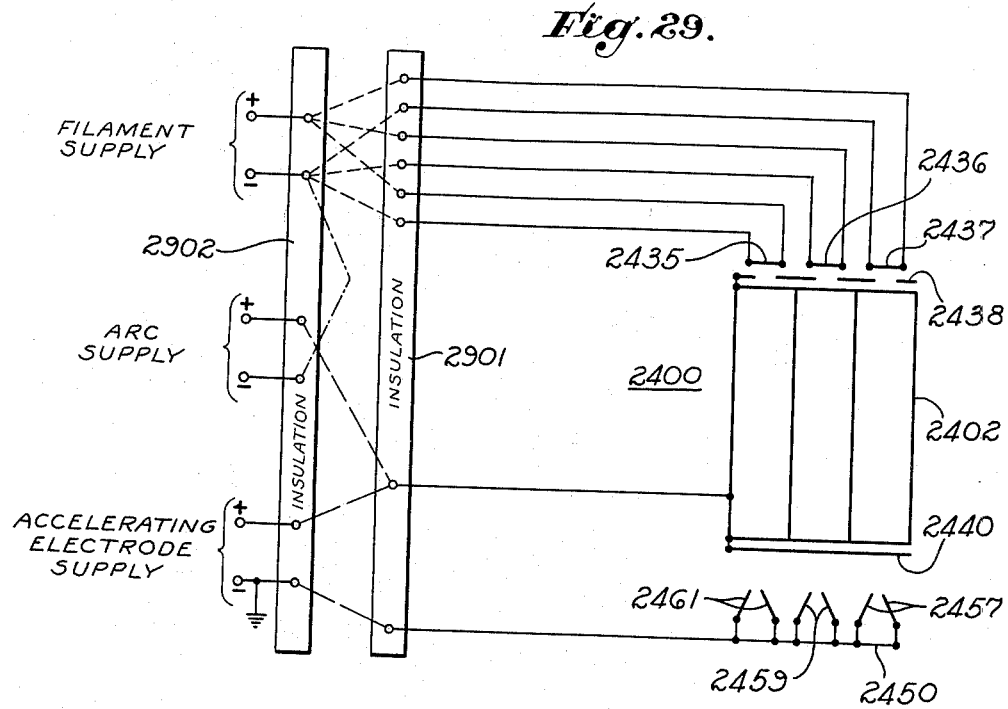
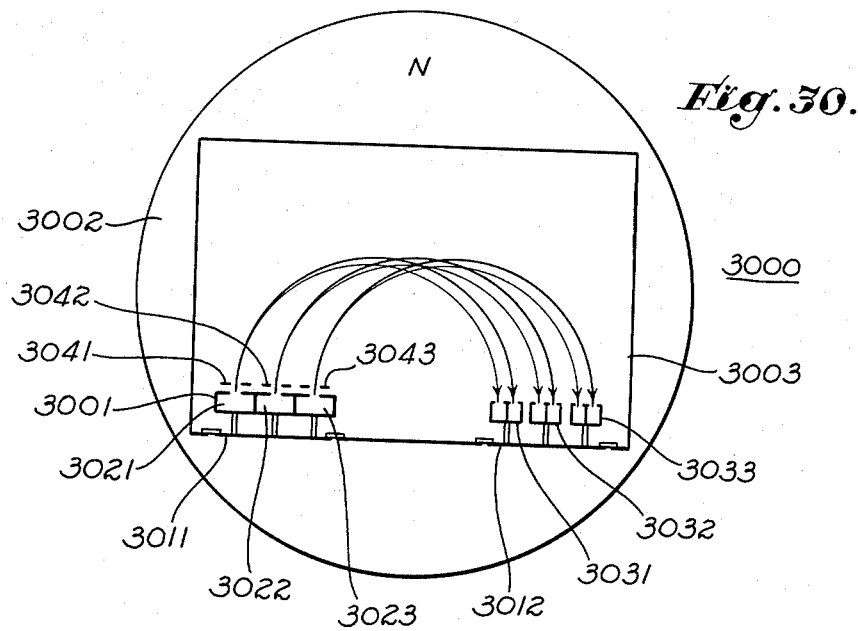

United States Patent Office 2,714,664
Patented Aug. 2, 1955

2,714,664

CALUTRONS

Ernest O. Lawrence, Berkeley, Calif., assignor to the United States of America as represented by the United States Atomic Energy Commission Application May 19, 1944, Serial No. 536,401

9 Claims. (Cl. 250—41.9)

The present invention relates to calutrons and more particularly to improvements in calutrons of the character disclosed in the copending application of Ernest O. Lawrence, Serial No. 557,784, filed October 9, 1944.

At the outset, it is noted that a "calutron" is a machine of the character of that disclosed in the above-mentioned Lawrence application, and is employed to separate the constituent isotopes of an element and, more particularly, to increase the proportion of a selected isotope in an element containing several isotopes in order to produce the element enriched with the selected isotope. For example, the machine is useful for the separation of isotopic material such as $Li^6$ and $Li^7$ and is especially useful in producing uranium enriched with $U^{235}$ as pointed out in the above-mentioned copending application S. N. 557,784.

Such a calutron essentially comprises means for vaporizing a quantity of material containing an element that is to be enriched with a selected one of its several isotopes; means for subjecting the vapor to ionization, whereby at least a portion of the vapor is ionized causing ions of the several isotopes of the element to be produced; electrical means for segregating the ions from the un-ionized vapor and for accelerating the segregated ions to relatively high velocities; electro-magnetic means for deflecting the ions along curved paths, the radii of curvature of the paths of the ions being proportional to the square roots of the masses of the ions, whereby the ions are concentrated in accordance with their masses; and means for deionizing and collecting the ions of the selected isotope thus concentrated, thereby to produce a deposit of the element enriched with the selected isotope.

It is an object of the invention to provide a calutron having an evacuated tank space that is utilized to a high degree of efficiency.

Another object of the invention is to provide a calutron in which a plurality of ion beams are transmitted in the evacuated tank space.

Another object of the invention is to provide a calutron comprising a plurality of transmitters arranged to transmit a corresponding plurality of ion beams in the evacuated tank space.

Another object of the invention is to provide a calutron comprising a plurality of transmitters disposed in a substantially regular pattern in the tank and arranged to transmit a corresponding plurality of substantially regularly disposed ion beams within the evacuated tank space, whereby the evacuated tank space is utilized in an economical manner.

Another object of the invention is to provide in a calutron, ion transmitting means arranged to transmit a plurality of ion beams in intersecting and non-interfering relation in the evacuated tank space.

Another object of the invention is to provide in a calutron, an improved ion transmitter unit.

Another object of the invention is to provide in a calutron, an ion transmitter unit arranged to transmit a corresponding plurality of ion beams.

A further object of the invention is to provide a calutron comprising a receiver and transmitting means arranged to transmit a plurality of ion beams through the evacuated tank space to the receiver, whereby a plurality of ion beams are focused upon a single receiver.

A further object of the invention is to provide a calutron comprising a tank including removable structure supporting a plurality of transmitters arranged to transmit a corresponding plurality of ion beams in the evacuated tank space, whereby the structure supports two or more of the transmitters and is removable from the tank together with the supported transmitters as a unit.

A further object of the invention is to provide a calutron comprising a tank including removable structure supporting a plurality of receivers, and a plurality of transmitters arranged to transmit a corresponding plurality of ion beams through the evacuated tank space to the receivers, whereby the structure supports two or more receivers and is removable from the tank together with the supported receivers as a unit.

A still further object of the invention is to provide a calutron comprising a tank including removable structure supporting a plurality of receivers as well as a plurality of transmitters, the transmitters being arranged to transmit a corresponding plurality of ion beams through the evacuated tank space to the receivers, whereby the structure supports at least one transmitter and at least one receiver and is removable from the tank together with the supported transmitter and receiver as a unit.

Figure 5:
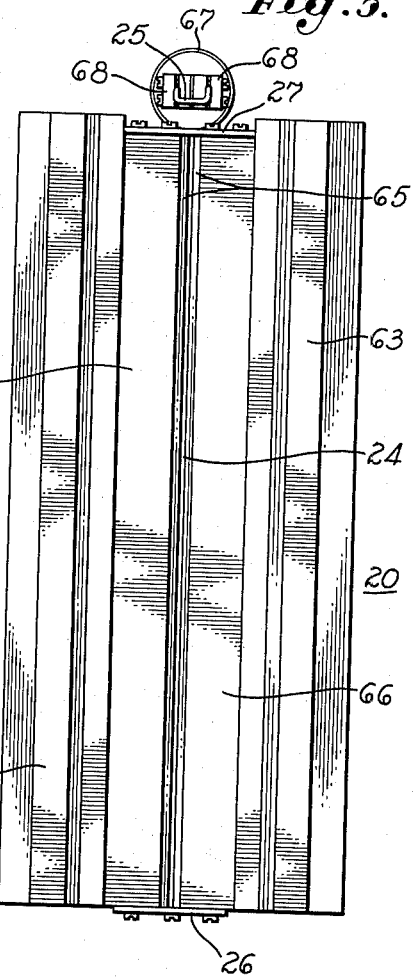
Figure 3:
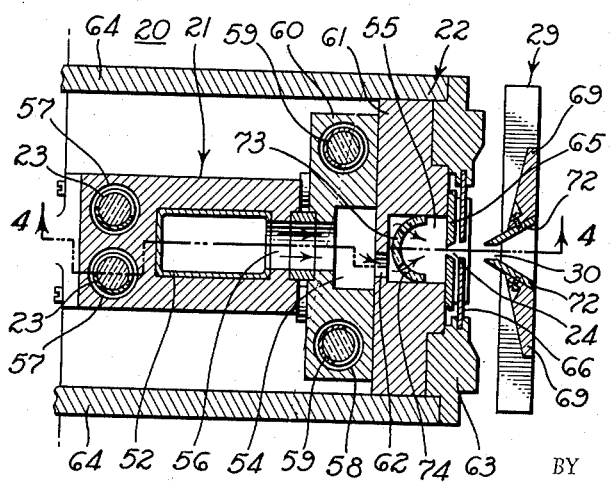
Figure 6:
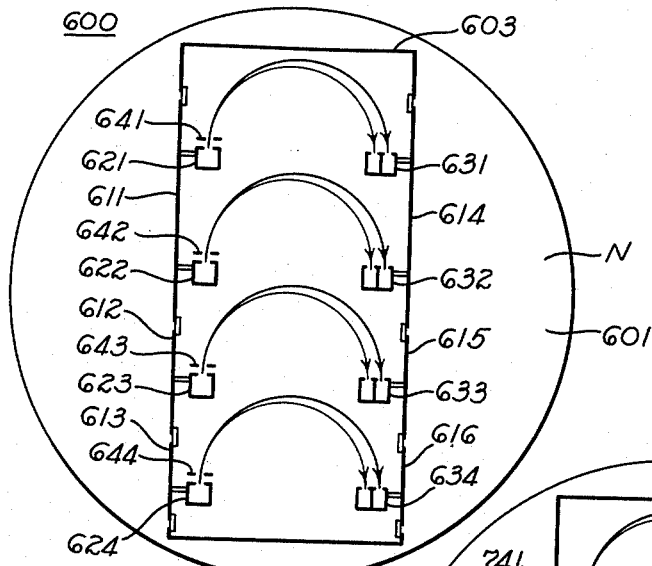
Figure 7:
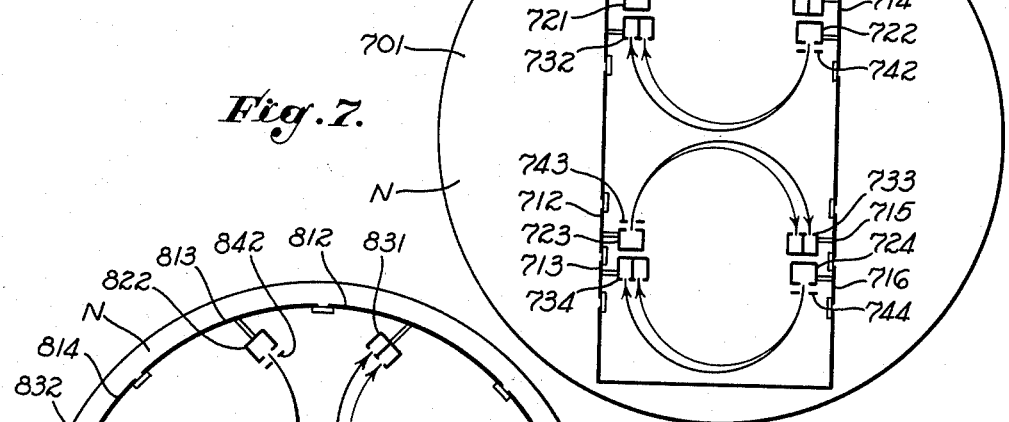
Figure 8:
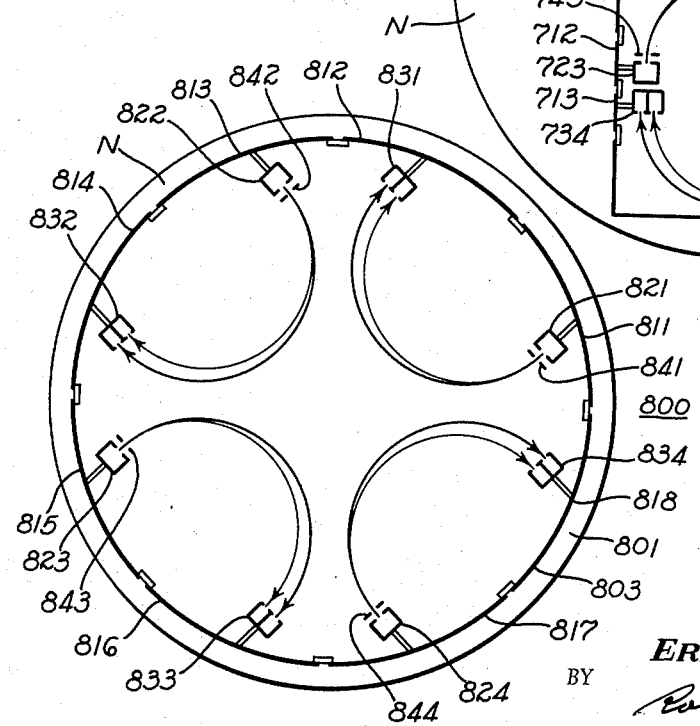
Figure 15:
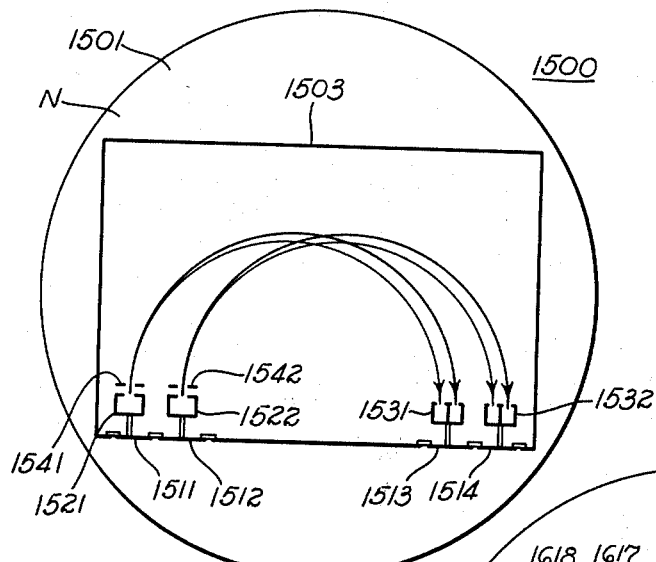
Figure 16:
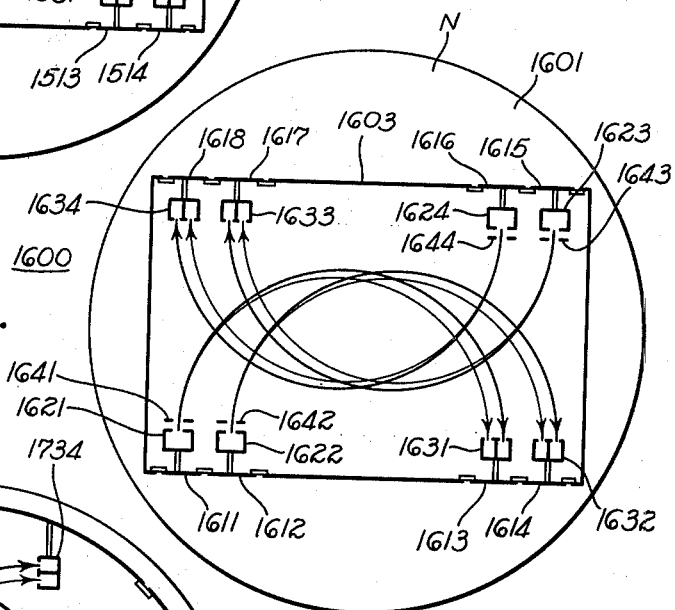
Figure 17:
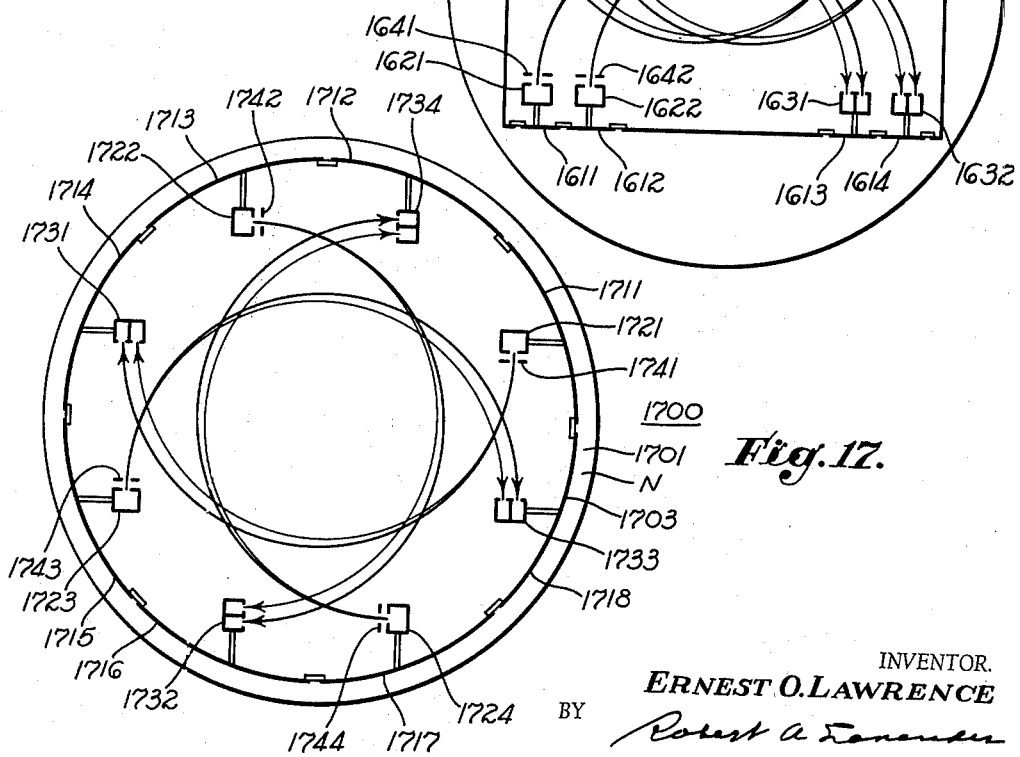
Figure 27:
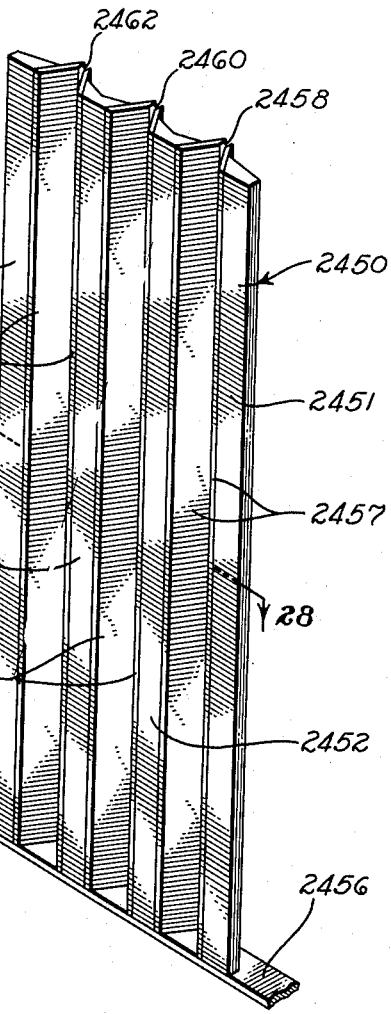
Figure 28:
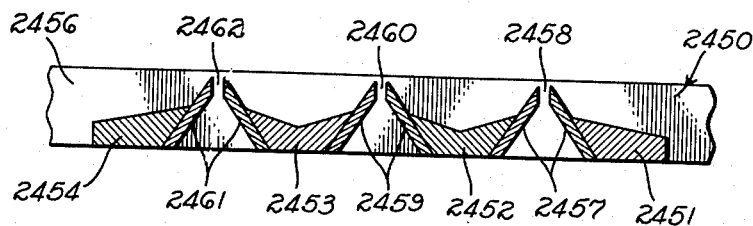

The invention, both as to its organization and method of operation, together with further objects and advantages thereof will best be understood by reference to the following specification taken in connection with the accompanying drawings, in which Figure 1 is a diagrammatic plan view of a representative calutron; Fig. 2 is a diagrammatic sectional view of the calutron taken along the line 2—2 in Fig. 1; Fig. 3 is a transverse sectional view of an ion transmitter unit incorporated in the calutron, taken along the line 3—3 in Fig. 4; Fig. 4 is a longitudinal sectional view of the ion transmitter unit taken along the line 4—4 in Fig. 3; Fig. 5 is a front elevational view of the ion transmitter unit shown in Figs. 3 and 4; Figs. 6, 7 and 8 are diagrammatic illustrations of three forms of calutrons embodying the features of the present invention and in which the ion beams are arranged in non-intersecting relation in a single plane; Fig. 9 is a diagrammatic illustration of another form of calutron embodying the features of the present invention and in which the ion beams are arranged in non-intersecting relation in upper and lower planes; Figs. 10 and 11 are diagrammatic sectional views of the calutron respectively taken along the lines 10—10 and 11—11 in Fig. 9; Fig. 12 is a diagrammatic illustration of another form of calutron embodying the features of the present invention and in which the ion beams are arranged in non-intersecting relation in upper and lower planes; Figs. 13 and 14 are diagrammatic sectional views of the calutron respectively taken along the lines 13—13 and 14—14 in Fig. 12; Figs. 15, 16 and 17 are diagrammatic illustrations of three forms of calutrons embodying the features of the present invention and in which the ion beams are arranged in intersecting relation in a single plane; Fig. 18 is a diagrammatic illustration of another form of calutron embodying the features of the present invention and in which the ion beams are arranged in intersecting relation in upper and lower planes; Figs. 19 and 20 are diagrammatic sectional views of the calutron respectively taken along the lines 19—19 and 20—20 in Fig. 18; Fig. 21 is a diagrammatic illustration of a further form of calutron embodying the features of the present invention and in which the ion beams are arranged in non-intersecting relation in either the same or different planes; Fig. 22 is a diagrammatic illustration of a further form of calutron embodying the features of the present invention and in which two ion beams are focused upon a single receiver; Fig. 23 is a diagrammatic illustration of a further form of calutron embodying the features of the present invention and in which two pairs of ion beams arranged in intersecting relation are focused upon two receivers; Fig. 24 is a transverse sectional view taken along the line 24—24 in Fig. 25 of an ion transmitter unit which may be incorporated in certain forms of calutrons and embodying the features of the present invention, this ion transmitter unit being arranged to transmit three ion beams; Fig. 25 is a longitudinal sectional view of the ion transmitter unit taken along the line 25—25 in Fig. 24; Fig. 26 is a front elevational view of the ion transmitter unit shown in Figs. 24 and 25; Fig. 27 is a fragmentary perspective view of the ion accelerating electrode structure forming a part of the ion transmitter unit shown in Figs. 24 to 26, inclusive; Fig. 28 is an enlarged fragmentary sectional view of the ion accelerating structure taken along the line 28—28 in Fig. 27; Fig. 29 illustrates diagrammatically a wiring diagram for the transmitter unit shown in Figs. 24 to 26, inclusive; and Fig. 30 is a diagrammatic illustration of a further form of calutron embodying the features of the present invention and incorporating an ion transmitter unit arranged to transmit three ion beams disposed in intersecting relation to three receivers.

Referring now more particularly to Figs. 1 and 2 of the drawings, there is illustrated a representative calutron 10 of the character noted, that comprises magnetic field structure including upper and lower pole pieces 11 and 12, provided with substantially parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer side walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus 13a is associated with the tank 13, whereby the interior of the tank 13 may be evacuated to a pressure of the order of $10^{-5}$ to $10^{-4}$ mm. Hg. Preferably, the component parts of the tank 13 are formed of steel, the top and bottom walls 14 and 15 thereof being spaced a short distance from the pole faces of the upper and lower pole pieces 11 and 12 respectively, the tank 13 being retained in such position in any suitable manner, whereby the top and bottom walls 14 and 15 constitute in effect pole pieces with respect to the interior of the tank 13, as explained more fully hereinafter.

The removable end wall 18 suitably supports an ion transmitter unit 20 comprising a charge receptacle 21 and a communicating arc-block 22. An electric heater 23 is arranged in heat exchange relation with the charge receptacle 21 and is adapted to be connected to a suitable source of heater supply, whereby the charge receptacle 21 may be appropriately heated, the charge receptacle 21 being formed of steel or the like. The arc-block 22 is formed, at least partially, of brass or the like and is substantially C-shaped in plan, an upstanding slot 24 being formed in the wall thereof remote from the charge receptacle 21. Thus, the arc-block 22 is of hollow construction, the cavity therein communicating with the interior of the charge receptacle 21.

Also, the removable end wall 18 carries a filamentary cathode 25 adapted to be connected to a suitable source of filament supply, the filamentary cathode 25 overhanging the upper end of the arc-block 22 and arranged in alignment with respect to the upper end of the cavity formed therein. The arc-block 22 carries an anode 26 disposed adjacent the lower end thereof and arranged in alignment with respect to the cavity formed therein. Also, the arc-block 22 carries a collimating electrode 27 disposed adjacent the upper end thereof and having an elongated collimating slot 28 formed therethrough and arranged in alignment with respect to the filamentary cathode 25 as well as the anode 26 and the cavity formed in the arc-block 22. Both the anode 26 and the collimating electrode 27 are electrically connected to the arc-block 22, which in turn is connected to the positive terminal of a suitable source of accelerating electrode supply, as explained more fully hereinafter. On the other hand, the tank 13 is grounded. Also, the filamentary cathode 25 and the cooperating anode 26 are adapted to be connected to a suitable source of arc supply.

Further, the removable end wall 18 carries ion accelerating structure 29, formed at least partially of tungsten or the like, and disposed in spaced-apart relation with respect to the wall of the arc-block 22 in which the slot 24 is formed. More specifically, a slit 30 is formed in the ion accelerating structure 29 and arranged in substantial alignment with respect to the slot 24 formed in the wall of the arc-block 22. The source of accelerating electrode supply is adapted to be connected between the arc-block 22 and the ion accelerating structure 29, the positive and negative terminals of the supply mentioned being respectively connected to the arc-block 22 and to the ion accelerating structure 29. Further, the negative terminal of the ion accelerating electrode supply is grounded.

The removable end wall 19 suitably supports an ion collector block 31 formed of stainless steel or the like, and provided with two laterally spaced-apart cavities or pockets 32 and 33 which respectively communicate with aligned slots 34 and 35 formed in the wall of the collector block 31 disposed remote from the removable end wall 19. It is noted that the pockets 32 and 33 are adapted to receive two constituent isotopes of an element which have been separated in the calutron 10, as explained more fully hereinafter. Finally, the collector block 31 is electrically connected to the ion accelerating structure 29. Thus it will be understood that the arc-block 22 is connected to the positive ungrounded terminal of the accelerating electrode supply; while the tank 13, the ion accelerating structure 29 and the collector block 31 are connected to the negative grounded terminal of the accelerating electrode supply; the arc-block 22 being electrically insulated from the component parts of the tank 13. Thus the portion of the tank 13 disposed between the ion accelerating structure 29 and the collector block 31 constitutes an electrostatic shield for the high-velocity ions traversing the curved paths between the slit 30 formed in the ion accelerating structure 29 and the slots 34 and 35 formed in the collector block 31, as explained more fully hereinafter.

Considering now the general principle of operation of the calutron 10, a charge comprising a compound of the element to be treated is placed in the charge receptacle 21, the compound of the element mentioned being one which may be readily vaporized. The end walls 18 and 19 are securely attached to the open ends of the tank 13, whereby the tank 13 is hermetically sealed. The various electrical connections are completed and operation of the vacuum pumping apparatus 13a associated with the tank 13 is initiated. When a pressure of the order of $10^{-5}$ to $10^{-4}$ mm. Hg is established within the tank 13, the electric circuits for the windings, not shown, associated with the pole pieces 11 and 12 are closed and adjusted, whereby a predetermined magnetic field is established therebetween traversing the tank 13. The electric circuit for the heater 23 is closed, whereby the charge in the charge receptacle 21 is heated and vaporized. The vapor fills the charge receptacle 21 and is conducted into the communicating cavity formed in the arc-block 22. The electric circuit for the filamentary cathode 25 is closed, whereby the filamentary cathode is heated and rendered electron emissive. Then the electric circuit between the filamentary cathode 25 and the anode 26 is closed, whereby an arc discharge is struck therebetween, electrons proceeding from the filamentary cathode 25 through the collimating slot 28 formed in the collimating electrode 27 to the anode 26. The collimating slot 28 formed in the collimating electrode 27 defines the cross-section of the stream of electrons proceeding into the arc-block 22, whereby the arc discharge has a ribbon-like configuration and breaks up the molecular form of the compound of the vapor to a considerable extent, producing positive ions of the element that is to be enriched with the selected one of its isotopes.

The electric circuit between the arc-block 22 and the ion accelerating structure 29 is completed, the ion accelerating structure 29 being at a high negative potential with respect to the arc-block 22, whereby the positive ions in the arc-block 22 are attracted by the ion accelerating structure 29 and accelerated through the voltage impressed therebetween. More particularly, the positive ions proceed from the cavity formed in the arc-block 22 through the slot 24 formed in the wall thereof, and across the space between the ion accelerating structure 29 and the adjacent wall of the arc-block 22, and thence through the slit 30 formed in the ion accelerating structure 29. The high-velocity positive ions form a vertical upstanding ribbon or beam proceeding from the cavity formed in the arc-block 22 through the slot 24 and the aligned slit 30.

As previously noted, the collector block 31, as well as the tank 13, is electrically connected to the ion accelerating structure 29, whereby there is an electric-field-free path for the high-velocity positive ions disposed between the ion accelerating structure 29 and the collector block 31 within the tank 13. The high-velocity positive ions are deflected from their normal straight-line path and from a vertical plane passing through the slot 24 and the aligned slit 30, due to the effect of the relatively strong magnetic field maintained through the space within the tank 13 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 34 into the pocket 32 formed in the collector block 31; whereas ions of the relatively heavy isotope of the element describe an exterior arc of relatively long radius and are focused through the slot 35 into the pocket 33 formed in the collector block 31. Accordingly, the ions of the relatively light isotope of the element are collected in the pocket 32 and are de-ionized to produce a deposit of the relatively light isotope of the element therein; while the ions of the relatively heavy isotope of the element are collected in the pocket 33 and are de-ionized to produce a deposit of the relatively heavy isotope of the element therein.

After all of the charge in the charge receptacle 21 has been vaporized, all of the electric circuits are interrupted and the end wall 18 is removed so that another charge may be placed in the charge receptacle 21 and subsequently vaporized in the manner explained above. After a suitable number of charges have been vaporized in order to obtain appropriate deposits of the isotope of the element in the pockets 32 and 33 of the collector block 31, the end wall 19 is removed and the deposits of the collected isotopes in the pockets 32 and 33 in the collector block 31 are reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection reference is again made to the copending application of Ernest O. Lawrence, for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge receptacle 21 is $UCl_4$, as this compound may be readily vaporized and the molecular form of the vapor may be readily broken up to form positive ions of uranium with great facility. In this case, uranium enriched with $U^{235}$ is collected in the pocket 32 of the collector block 31, and uranium comprising principally $U^{238}$ is collected in the pocket 33 of the collector block 31. Also, it is noted that from a practical standpoint, the deposit of uranium collected in the pocket 32 of the collector block 31 contains considerable amounts of $U^{238}$, in view of the fact that this isotope comprises the dominant constituent of normal uranium. Furthermore, the deposit of uranium collected in the pocket 32 of the collector block 31 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 32 of the collector block 31 is considerably enriched, both with $U^{234}$ and with $U^{235}$, and considerably impoverished with respect to $U^{238}$ as compared to natural or normal uranium.

Referring now more particularly to Figs. 3 to 5, inclusive, of the drawings, there are illustrated the structural details of the ion transmitter unit 20 which is arranged in the magnetic field between the pole pieces of the calutron in the manner previously explained, the transmitter unit 20 comprising the charge receptacle 21 and the arc-block 22. The charge receptacle 21 comprises wall structure, including a removable cover 50, defining an upstanding cavity 51 therein, that is adapted to receive a removable charge bottle 52 containing a charge 53 which is to be vaporized. The arc-block 22 comprises wall structure defining an upstanding distributing chamber 54 and an upstanding arc chamber 55 therein, the cavity 51 communicating with the distributing chamber 54 through a tubular member 56 supported by the wall structure of the charge receptacle 21 and the wall structure of the arc-block 22. The wall structure of the charge receptacle 21 has two upstanding cavities 57 formed therein, in which two elements of the electric heater 23 are arranged. Preferably, each element of the electric heater 23 comprises a coil of resistance wire wound on a supporting insulator, as indicated, whereby each element of the electric heater 23 may be independently placed in and removed from the associated cavity 57. Thus, the charge receptacle 21, and consequently the charge bottle 52, may be appropriately heated in order to vaporize the charge 53 contained in the charge bottle 52. Similarly, the arc-block 22 has two upstanding cavities 58 formed therein, in which two electric heating elements 59 are arranged. Preferably, each of the electric heating elements 59 comprises a coil of resistance wire wound on a supporting insulator, as indicated, whereby each of the electric heating elements 59 may be independently placed in and removed from the associated cavity 58. Thus, the arc-block 22, and more particularly the distributing chamber 54 therein, may be heated in order to prevent condensation of the contained vapor, as explained more fully hereinafter.

More particularly, the wall structure of the charge receptacle 21 is formed of copper or brass; and the wall structure of the arc-block 22 is formed of copper or brass and comprises two primary members 60 and 61. The distributing chamber 54 and the cavities 58 are formed in the member 60; while the arc chamber 55 is formed in the member 61, a series of longitudinally spaced-apart openings 62 being formed in the wall of the member 61 and communicating between the distributing chamber 54 and the arc chamber 55. Also, the arc-block 22 comprises a front plate 63 formed of copper or brass and secured to the member 61; the source unit 20 being supported by two rearwardly extending arms 64 which are secured to the member 61 and the front plate 63.

Two upstanding strips 65, formed of tungsten or the like, are secured to the member 61 adjacent the arc chamber 55, thereby to define an upstanding slot therebetween communicating with the arc chamber 55. Also, two upstanding strips 66, formed of tungsten or the like, are secured to the front plate 63 adjacent the strips 65 and spaced a small distance forwardly with respect thereto, thereby to define an upstanding slot between the strips 66 communicating with the arc chamber 55. Thus, the slot defined between the strips 65 and the slot defined between the strips 66 constitute the upstanding slot 24 formed in the front wall of the arc-block 22 and communicating with the arc chamber 55.

The filamentary cathode 25 is supported by cathode structure 67 arranged in cooperating relation with respect to the arc-block 22, the cathode structure 67 including two terminals 68. The opposite ends of the filamentary cathode 25 are removably clamped in place by the respective terminals 68, and the two terminals are connected to the source of filament supply, as previously noted. The central portion of the filamentary cathode 25 overhangs the central portion of the top wall of the arc-block 22; and the collimating electrode 27 is secured to the top wall of the arc-block 22, the collimating electrode 27 having the transverse slot 28 formed therein, as previously noted, and communicating with the arc chamber 55. More particularly, the filamentary cathode 25 is spaced a short distance above the collimating electrode 27, the central portion of the filamentary cathode 25 being arranged in alignment with the transverse slot 28 formed in the collimating electrode 27. Also, the anode 26 is secured to the bottom wall of the arc-block 22 adjacent the lower end of the arc chamber 55, and in alignment with the central portion of the filamentary cathode 25 and the transverse slot 28 formed in the collimating electrode 27.

The negative and positive terminals of the arc supply are respectively connected to the filamentary cathode 25 and to the arc-block 22, the anode 26 and the collimating electrode 27 being connected together by the arc-block 22 and consequently to the positive terminal of the arc supply mentioned, as previously noted. Further, the ion accelerating structure 29 comprises two upstanding strips 69 disposed forwardly of the strips 66 and secured to two transversely-extending top and bottom members 70 and 71 to form a unitary structure. The two strips 69 are arranged in transverse spaced-apart relation and carry two electrodes 72, formed of tungsten or the like. The two electrodes 72 are arranged in transverse spaced-apart relation to define the upstanding slit 30 therebetween, and arranged in alignment with the slot 24 formed in the front wall of the arc-block 22.

As previously noted, the ion accelerating structure 29, together with the arc-block 22, is supported by the removable end wall 18 of the calutron 10, and the positive and negative terminals of the accelerating electrode supply are respectively connected to the arc-block 22 and the ion accelerating structure 29. Finally, an upstanding semi-circular baffle plate 73, formed of quartz or the like, is arranged in the arc chamber 55, and has a series of longitudinally spaced-apart openings 74 formed therein.

Considering now the detailed operation of the ion transmitter unit 20, when the electric circuit for the heater 23 is completed the charge receptacle 21 and consequently the charge bottle 52 are heated, whereby the charge 53 is vaporized, filling the cavity in the charge bottle 52. The vapor passes through the tubular member 56 into the distributing chamber 54, whereby this chamber is filled with the vapor. The vapor is distributed in the distributing chamber 54 and passes through the openings 62 formed in the wall of the member 61 into the rear part of the arc chamber 55. The vapor then passes through the openings 74 formed in the baffle plate 73, into the front part of the arc chamber 55, whereby this part of the arc chamber 55 is filled with the vapor. More particularly, the arc chamber 55 is thoroughly and substantially uniformly filled with the vapor to be ionized, due to the arrangement of the distributing chamber 54 and the baffle plate 73.

When the circuit for the filamentary cathode 25 is completed, the filamentary cathode is heated and rendered electron emissive; and when the arc supply circuit is completed between the filamentary cathode 25 and the arc-block 22, electrons are projected from the central portion of the filamentary cathode 25 toward the collimating electrode 27. More particularly, some of these electrons pass through the transverse slot 28 formed in the collimating electrode 27, into the arc chamber 55, and proceed toward the anode 26. Accordingly, the collimating electrode 27 causes a stream of electrons having a ribbon-like configuration to be projected through the arc chamber 55, whereby the vapor in the arc chamber is ionized. When the accelerating electrode supply circuit is completed, the positive ions produced in the arc chamber 55 are drawn through the upstanding slot 24 formed in the front wall of the arc-block 22 by the associated ion accelerating structure 29, to form a beam of positive ions having an upstanding substantially ribbon-like configuration proceeding through the slit 30 between the electrodes 72; which beam of positive ions is projected through the evacuated tank space toward the cooperating collector block 31, in the manner previously explained.

In view of the foregoing description, it will be understood that the arc-block 22 and the set of associated electrodes constitute an ion generator or gas-ionizing device operative to produce ions from the vapor of polyisotopic material supplied thereto through the associated distributing chamber 54 from the charge bottle 52; which ion generator, in conjunction with the associated ion accelerating structure 29, constitutes the ion transmitter unit 20. Also, the ion collector block 31 constitutes an ion receiver unit. Hence, the calutron 10 comprises a single transmitter unit 20 arranged to transmit a single beam of ions through the evacuated space in the tank 13 to the associated receiver unit 31, the transmitter unit 20 being supported by the removable end wall 18 and the receiver unit 31 being supported by the removable end wall 19, as previously explained.

Referring now more particularly to Fig. 6, there is illustrated a calutron 600 embodying the features of the present invention and comprising a number of transmitters, of the general construction and arrangement of the transmitter 20, and magnetic field structure, the north pole of which is indicated at 601. Also, the calutron 600 comprises an evacuated tank 603, substantially rectangular in plan, including wall structure provided with a number of removable panels 611 to 616, inclusive, supporting the transmitters 621 to 624, inclusive, and a number of receivers 631 to 634, inclusive. Specifically, the removable panel 611 supports the two transmitters 621 and 622, while the removable panels 612 and 613 respectively support the transmitters 623 and 624. Similarly, the removable panel 614 supports the two receivers 631 and 632, while the removable panels 615 and 616 respectively support the receivers 633 and 634. Of course it will be understood that the panel arrangement may be appropriately varied, whereby any removable panel may support one or any desired number of transmitters or receivers, the panel arrangement specified being merely illustrative.

In the calutron 600, the four transmitters 621 to 624, inclusive, comprise ion generators and individually associated ion accelerating structures 641 to 644, inclusive, and are individually paired with the four receivers 631 to 634, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 601 being disposed below the tank 603; also, each of the four ion beams is disposed substantially transversely of the longitudinal axis of the magnetic field. Also, the transmitters 621 to 624, inclusive, are arranged in a linear array, the receivers 631 to 634, inclusive, are arranged in a linear array; whereby both the transmitters and the receivers are arranged in regular arrays, resulting in the formation of a substantially regular pattern of the four ion beams in the tank 603. More specifically, the four ion beams in the tank 603 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. While the calutron 600 is illustrated for purposes of explanation as comprising four transmitter-receiver pairs, the actual number of transmitter-receiver pairs is limited only by physical considerations.

Of course it will be understood that the general principle of operation of the calutron 600 is the same as that of the calutron 10; each transmitter transmits an ion beam to the associated receiver; the respective lighter and heavier isotopes of the element treated are disposed adjacent the inner and outer boundaries of the ion beam adjacent the receiver, whereby the respective lighter and heavier isotopes of the element treated are respectively collected in the two pockets of the associated receiver; all in the manner previously explained. Thus it will be understood that in the calutron 600, the evacuated space in the tank 603 is utilized very economically, in that the volume thereof is only somewhat greater than the volume of the tank of the single-beam calutron 10, although four ion beams instead of one are disposed therein. Accordingly, the calutron 600 has an isotope separating capacity of the order of four times that of the single-beam calutron 10, although it is only of somewhat larger dimensions and requires only slightly larger associated vacuum pumping apparatus.

Moreover, in the calutron 600 the panel arrangement permits ready removal of any one of the panels 611, 614, etc., from the wall of the tank 603, whereby a blank panel may be inserted in its place and the calutron operated with a corresponding reduction in the number of ion beams, in an obvious manner. This arrangement permits operation of the calutron 600 with a reduced number of ion beams, with one or more of the panels removed, when it is necessary to adjust or repair the supported transmitter or receiver.

Referring now more particularly to Fig. 7, there is illustrated a calutron 700 embodying the features of the present invention and comprising a number of transmitters, of the general construction and arrangement of the transmitter 20, and magnetic field structure, the north pole of which is indicated at 701. Also, the calutron 700 comprises an evacuated tank 703, substantially rectangular in plan, including wall structure provided with a number of removable panels 711 to 716, inclusive, supporting the transmitters 721 to 724, inclusive, and a number of receivers 731 to 734, inclusive. Specifically, the removable panel 711 supports the transmitter 721 and the receiver 732, while the removable panels 712 and 713 respectively support the transmitter 723 and the receiver 734. Similarly, the removable panel 714 supports the receiver 731 and the transmitter 722, while the removable panels 715 and 716 respectively support the receiver 733 and the transmitter 724. Of course it will be understood that the panel arrangement may be appropriately varied, whereby any removable panel may support one or any desired number of transmitters or receivers, the panel arrangement specified being merely illustrative.

In the calutron 700, the four transmitters 721 to 724, inclusive, comprise ion generators and individually associated ion accelerating structures 741 to 744, inclusive, and are individually paired with the four receivers 731 to 734, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 701 being disposed below the tank 703; also, each of the four ion beams is disposed substantially transversely of the longitudinal axis of the magnetic field. Also, the transmitters 721 and 723 and the receivers 732 and 734 are arranged in a linear array; the transmitters 722 and 724 and the receivers 731 and 733 are arranged in a linear array; whereby both the transmitters and the receivers are arranged in regular arrays, resulting in the formation of a substantially regular pattern of the four ion beams in the tank 703. More specifically, the four ion beams in the tank 703 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. While the calutron 700 is illustrated for purposes of explanation as comprising four transmitter-receiver pairs, the actual number of transmitter-receiver pairs is limited only by physical considerations.

In view of the foregoing, it will be understood that the general construction and arrangement of the calutron 700 is quite similar to that of the calutron 600, that it embodies the same structural advantages, and that the principle of operation is substantially identical.

Referring now more particularly to Fig. 8, there is illustrated a calutron 800 embodying the features of the present invention and comprising a number of transmitters, of the general construction and arrangement of the transmitter 20, and magnetic field structure, the north pole of which is indicated at 801. Also, the calutron 800 comprises an evacuated tank 803, substantially circular in plan, including wall structure provided with a number of removable panels 811 to 818, inclusive, supporting transmitters 821 to 824, inclusive, and a number of receivers 831 and 834, inclusive. Specifically, the removable panels 811, 813, 815 and 817 respectively support the transmitters 821, 822, 823 and 824, while the removable panels 812, 814, 816 and 818 respectively support the receivers 831, 832, 833 and 834. Of course it will be understood that the panel arrangement may be appropriately varied, whereby any removable panel may support one or any desired number of transmitters or receivers, the panel arrangement specified being merely illustrative.

In the calutron 800, the four transmitters 821 to 824, inclusive, comprise ion generators and individually associated ion accelerating structures 841 to 844, inclusive, and are individually paired with the four receivers 831 to 834, inclusive, whereby four ion beams are transmitted through the evacuated tank space from the four transmitters to the four reecivers. Each of the four ion beams is arcuate-shaped, being substantially semi-circular, the ions traveling in a clockwise direction, due to the disposition of the magnetic field, the north magnetic pole 801 being disposed below the tank 803; also, each of the four ion beams is disposed substantially transversely of the longitudinal axis of the magnetic field. Also, the transmitters 821 and 824, inclusive, are arranged in a circular array, the receivers 831 to 834, incuusive, are arranged in a circular array; whereby both the transmitters and the receivers are arranged in regular arrays, resulting in the formation of a substantially regular pattern of the four ion beans in the tank 803. More specifically, the four ion beams in the tank 803 are disposed in a fourfold symmetrical arrangement about the center of the tank 803. While the calcutron 800 is illustrated for purposes of explanation as comprising four transmitter-receiver pairs, the actual number of transmitter-receiver pairs is limited only by physical considerations.

In view of the foregoing, it will be undertsood that the general construction and arrangement of the calutron 800 is quite similar to that of the calutron 600, that it embodies the same structural advantages, and that the principle of operation is substantially identical.

In the calutrons 600, 700 and 800, respectively shown in Figs. 6, 7 and 8, the various transmitter-receiver pairs are illustrated as being arranged along a single plane normal to the axis of the magnetic field, although it will be understood that they may be disposed along a number of longitudinally spaced-apart parallel planes normal to the axis mentioned. This alternative disposition of the transmitter-receiver pairs will be readily understood from an examination of the calutron 900, illustrated in Figs. 9 to 11, inclusive, and the calutron 1200, illustrated in Figs. 12 to 14, inclusive. More particularly, the calutrons 900 and 1200 respectively correspond to the calutrons 600 and 700, wherein the transmitter-receiver pairs are arranged along two longitudinally spaced-apart planes normal to the axis of the magnetic field, as is more fully explained hereinafter.

Referring now more particularly to Figs. 9 to 11, inclusive, there is illustrated the calutron 900 embodying the features of the present invention and comprising a number of transmitters, of the general construction and arrangement of the transmitter 20, and magnetic field structure including north and south poles 901 and 902, respectively, and an evacuated tank 903 arranged between the poles mentioned. The tank 903 is substantially rectangular in plan and includes wall structure provided with a number of removable panels 911 to 916, inclusive, supporting the transmitters 921 to 924, inclusive, and a number of reecivers 931 to 934, inclusive. Specifically, the removable panel 911 supports the two transmitters 921 to 922, while the removable panels 912 and 913 respectively support the transmitters 923 and 924. Similarly, the removable panel 914 supports the two receivers 931 and 932, while the removable panels 915 and 916 respectively support the receivers 933 and 934. Of course it will be understood that the panel arrangement may be appropriately varied, whereby any removable panel may support one or any desired number of transmitters or receivers, the panel arrangement specified being merely illustrative.

In the calutron 900, the four transmitters 921 to 924, inclusive, comprise ion generators and individually associated ion accelerating structures 941 to 944, inclusive, and are individually paired with the four receivers 931 to 934, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 901 being disposed below the tank 903; also, each of the four ion beams is disposed substantially transversely of the longitudinal axis of the magnetic field. Also, the transmitters 921 and 923 and the transmitters 922 and 924 are arranged in parallel linear arrays; the receivers 931 and 933 and the receivers 932 and 934 are arranged in parallel linear arrays; whereby both the transmitters and the receivers are arranged in regular arrays, resulting in the fomation of a substantially regular pattern of the four ion beams in the tank 903. More specifically, the transmitter-receiver pairs 921—931 and 923—933 are arranged along an upper plane substantially normal to the axis of the magnetic field; while the transmitter-receiver pairs 922—932 and 924—934 arranged along a lower plane substantially normal to the axis mentioned. Accordingly, the two upper ion beams transmitted by the transmitters 921 and 923 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. Similarly, the two lower ion beams transmitted by the transmitters 922 and 924 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. The two vertical planes of approximate symmetry are coincident; and the two horizontal planes of symmetry along which the two pairs of ion beams are disposed are arranged in longitudinally spaced apart parallel relation substantially normal to the axis of the magnetic field. While the calutron 900 is illustrated for purposes of explanation as comprising four transmitter-receiver pairs arranged along two longitudinally spaced-apart parallel planes, the actual number of transmitter-receiver pairs, as well as the number of longitudinally spaced-apart parallel planes along which they are arranged, is limited only by physical considerations.

In view of the foregoing, it will be understood that the general construction and arrangement of the calutron 900 is quite similar to that of the calutron 600, that it embodies at least the same structural advantages, and that the principle of operation is substantially identical.

Referring now more particularly to Figs. 12 to 14, inclusive, there is illustrated the calutron 1200 embodying the features of the present invention and comprising a number of transmitters of the general construction and arrangement of the transmitter 20, and magnetic field structure including north and south poles 1201 and 1202, respectively, and an evacuated tank 1203 arranged between the poles mentioned. The tank 1203 is substantially rectangular in plan and includes wall structure provided with a number of removable panels 1211 to 1216, inclusive, supporting the transmitters 1221 to 1224, inclusive, and a number of receivers 1231 to 1234, inclusive. Specifically, the removable panel 1211 supports the transmitter 1221 and the receiver 1232, while the removable panels 1212 and 1213 respectively support the transmitter 1223 and the receiver 1234. Similarly, the removable panel 1214 supports the receiver 1231 and the transmitter 1222, while the removable panels 1215 and 1216 respectively support the receiver 1233 and the transmitter 1224. Of course it will be understood that the panel arrangement may be appropriately varied, whereby any removable panel may support one or any desired number of transmitters or receivers, the panel arrangement specified being merely illustrative.

In the calutron 1200, the four transmitters 1221 to 1224, inclusive, comprise ion generators and individually associated ion accelerating structures 1241 to 1244, inclusive, and are individually paired with the four receivers 1231 to 1234, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 1201 being disposed below the tank 1203; also, each of the four ion beams is disposed substantially transversely of the longitudinal axis of the magnetic field. Also, the transmitters 1221 and 1223 and the receivers 1232 and 1234 are arranged in parallel linear arrays; the transmitters 1222 and 1224 and the receivers 1231 and it embodies at least the same structural advantages, and that the principle of operation is substantially identical.

In the calutrons 1500, 1600 and 1700, respectively shown in Figs. 15, 16 and 17, the various transmitter-receiver pairs are illustrated as being arranged along a single plane normal to the axis of the magnetic field, although it will be understood that they may be disposed along a number of longitudinally spaced-apart parallel planes normal to the axis mentioned. This alternative disposition of the transmitter-receiver pairs will be readily understood from an examination of the calutron 1800, illustrated in Figs. 18 to 20, inclusive. More particularly, the calutron 1800 corresponds to the calutron 1600, wherein the transmitter-receiver pairs are arranged along two longitudinally spaced-apart planes normal to the axis of the magnetic field, as is more fully explained hereinafter.

Referring now more particularly to Figs. 18 to 20, inclusive, there is illustrated the calutron 1800 embodying the features of the present invention and comprising a number of transmitters, of the general construction and arrangement of the transmitter 20, and magnetic field structure, including north and south poles 1801 and 1802, respectively, and an evacuated tank 1803 arranged between the poles mentioned. The tank 1803 is substantially rectangular in plan and includes wall structure provided with a number of removable panels 1811 to 1818, inclusive, supporting the transmitters 1821 to 1824, inclusive, and a number of receivers 1831 to 1834, inclusive. Specifically, the removable panels 1811 and 1812 respectively support the two transmitters 1821 and 1822, while the removable panels 1813 and 1814 respectively support the two receivers 1831 and 1832. Similarly, the removable panels 1815 and 1816 respectively support the two transmitters 1823 and 1824, while the removable panels 1817 and 1818 respectively support the two receivers 1833 and 1834. Of course it will be understood that the panel arrangement may be appropriately varied, whereby any removable panel may support one or any desired number of transmitters or receivers, the panel arrangement specified being merely illustrative.

In the calutron 1800, the four transmitters 1821 to 1824, inclusive, comprise ion generators and individually associated ion accelerating structures 1841 and 1844, inclusive, and are individually paired with the four receivers 1831 to 1834, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 1801 being disposed below the tank 1803; also, each of the four ion beams is disposed substantially transversely of the longitudinal axis of the magnetic field. Also, the transmitter-receiver pairs 1821—1831 and 1822—1832 are arranged in parallel linear arrays; the transmitter-receiver pairs 1823—1833 and 1824—1834 are arranged in parallel linear arrays; whereby both the transmitters and the receivers are arranged in regular arrays, resulting in the formation of a substantially regular pattern of the four ion beams in the tank 1803.

More specifically, the transmitter-receiver pairs 1821—1831 and 1823—1833 are arranged along an upper plane substantially normal to the axis of the magnetic field; while the transmitter-receiver pairs 1822—1832 and 1824—1834 are arranged along a lower plane substantially normal to the axis mentioned.

Accordingly, the two upper ion beams transmitted by the transmitters 1821 and 1823 are arranged in double intersecting or crossing relation; and the two lower ion beams transmitted by the transmitters 1822 and 1824 are arranged in double intersecting or crossing relation. Thus the two pairs of ion beams are disposed along two longitudinally spaced apart parallel planes substantially normal to the axis of the magnetic field. More specifically, the two upper ion beams transmitted by the transmitters 1821 and 1823 have a common upper horizontal plane of symmetry; the two lower ion beams transmitted by the transmitters 1822 and 1824 have a common lower horizontal plane of symmetry; the upper and lower ion beams respectively transmitted by the transmitters 1821 and 1824 have a common vertical plane of approximate symmetry; and the upper and lower ion beams respectively transmitted by the transmitters 1823 and 1822 have a common vertical plane of approximate symmetry. The vertical plane of approximate symmetry individual to the ion beams transmitted by the two transmitters 1821 and 1824 is constructed normal to and substantially bisects two substantially parallel lines respectively drawn in the two horizontal planes of symmetry between the respective transmitter-receiver pairs 1821—1831 and 1824—1834. Similarly, the vertical plane of approximate symmetry individual to the ion beams transmitted by the two transmitters 1822 and 1823 is constructed normal to and substantially bisects two substantially praallel lines respectively drawn in the two horizontal planes of symmetry between the respective transmitter-receiver pairs 1822—1832 and 1823—1833.

While the calutron 1800 is illustrated for purposes of explanation as comprising four transmitter-receiver pairs arranged along two longitudinally spaced-apart parallel planes, the actual number of transmitter-receiver pairs, as well as the number of longitudinally spaced-apart parallel planes along which they are arranged, is limited only by physical considerations.

In view of the foregoing, it will be understood that the general construction and arrangement of the calutron 1800 is quite similar to that of the calutron 1600, that it embodies at least the same structural advantages, and that the principle of operation is substantially identical.

Referring now more particularly to Fig. 21, there is illustrated a calutron 2100 embodying the features of the present invention and comprising a number of transmitters of the general construction and arrangement of the transmitter 20, and magnetic field structure the north pole of which is indicated at 2101. Also, the calutron 2100 comprises an evacuated tank 2103, substantially circular in plan, including wall structure provided with a number of removable panels 2111 to 2114, inclusive, respectively supporting the transmitters 2121 to 2124, inclusive. Of course it will be understood that the panel arrangement may be appropriately varied, whereby any removable panel many support one or any desired number of transmitters, the panel arrangement specified being merely illustrative. Also, the calutron 2100 comprises centrally disposed removable supporting structure 2150, arranged within the tank 2103 and carrying a number of receivers 2131 to 2134, inclusive, the supporting structure 2150 and the receivers carried thereby being removable from the tank 2103 as a unit when the bottom or top wall, not shown, of the tank is removed. While it is preferred that the supporting structure 2150 be removable in the manner noted, it may of course be removed through an opening provided in the side wall of the tank 2103 by having a removable panel in the side wall structure of the tank accommodating this end.

In the calutron 2100, the four transmitters 2121 to 2124, inclusive, comprise ion generators and individually associated ion accelerating structures 2141 to 2144, inclusive, and are individually paired with the four receivers 2131 to 2134, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 2101 being disposed below the tank 2103; also, each of the four ion beams is disposed substantially transversely of the longitudinal axis of the magnetic field. Also, the transmitters 2121 to 2124, inclusive, are arion beam adjacent the receiver, whereby the respective lighter and heavier isotopes of the element treated are respectively collected in the two pockets of the associated receiver; all in the manner previously explained. Furthermore, in the calutron 1500 the evacuated space in the tank 1503 is utilized even more economically than the evacuated space in the tank in the calutron 600, due to the intersecting or crossing relation of the ion beams, permitting even more compact arrangement of the transmitter-receiver pairs. In the operation of the calutron 1500, it has been found that the two ion beams transmitted in the evacuated tank space are quite stable and very satisfactory in operation, in spite of the fact that they are in intersecting or crossing relation; this discovery was entirely unexpected, and permits the previously noted compact arrangement of the transmitter-receiver pairs in the tank 1503.

Referring now more particularly to Fig. 16, there is illustrated a calutron 1600 embodying the features of the present invention and comprising a number of transmitters of the general construction and arrangement of the transmitter 20, and magnetic field structure, the north pole of which is indicated at 1601. Also, the calutron 1600 comprises an evacuated tank 1603, substantially rectangular in plan, including wall structure provided with a number of removable panels 1611 to 1618, inclusive, supporting the transmitters 1621 to 1624, inclusive, and a number of receivers 1631 to 1634, inclusive. Specifically, the removable panels 1611 and 1612 respectively support the two transmitters 1621 and 1622, while the removable panels 1613 and 1614 respectively support the two receivers 1631 and 1632. Similarly, the removable panels 1615 and 1616 respectively support the two transmitters 1623 and 1624, while the removable panels 1617 and 1618 respectively support the two receivers 1633 and 1634. Of course it will be understood that the panel arrangement may be appropriately varied, whereby any removable panel may support one or any desired number of transmitters or receivers, the panel arrangement specified being merely illustrative.

In the calutron 1600, the four transmitters 1621 to 1624, inclusive, comprise ion generators and individually associated ion accelerating structures 1641 to 1644, inclusive, and are individually paired with the four receivers 1631 to 1634, inclusive, whereby four ion beams are transmitted through the evacuated tank space from the four transmitters to the four receivers. Each of the four ion beams is arcuate-shaped, being substantially semicircular, the ions traveling in a clockwise direction, due to the disposition of the magnetic field, the north magnetic pole 1601 being disposed below the tank 1603; also, each of the four ion beams is disposed substantially the two ion beams transmitted by the two transmitters 1622 and 1623 have a common vertical plane of approximate symmetry. The vertical plane of approximate symmetry individual to the ion beams transmitted by the two transmitters 1621 and 1624 is constructed normal to and substantially bisects two substantially parallel lines drawn in the horizontal plane of symmetry between the respective transmitter-receiver pairs 1621—1631 and 1624—1634; similarly, the vertical plane of approximate symmetry individual to the ion beams transmitted by the two transmitters 1622 and 1623 is constructed normal to and substantially bisects two substantially parallel lines drawn in the horizontal plane of symmetry between the respective transmitter-receiver pairs 1622—1632 and 1623—1633. Thus the two vertical planes of approximate symmetry are substantially parallel. While the calutron 1600 is illustrated for purposes of explanation as comprising four transmitter-receiver pairs, the actual number of transmitter-receiver pairs is limited only by physical considerations.

In view of the foregoing, it will be understood that the general construction and arrangement of the calutron 1600 is quite similar to that of the calutron 1500, that it embodies at least the same structural advantages, and that the principle of operation is substantially identical.

Referring now more particularly to Fig. 17, there is illustrated a calutron 1700 embodying the features of the present invention and comprising a number of transmitters of the general construction and arrangement of the transmitter 20, and magnetic field structure, the north pole of which is indicated at 1701. Also, the calutron 1700 comprises an evacuated tank 1703, substantially circular in plan, including wall structure provided with a number of removable panels 1711 to 1718, inclusive, supporting the transmitters 1721 to 1724, inclusive, and a number of receivers 1731 to 1734, inclusive. Specifically, the removable panels 1711, 1713, 1715 and 1717 respectively support the transmitters 1721, 1722, 1723 and 1724, while the removable panels 1712, 1714, 1716 and 1718 respectively support the receivers 1734, 1731, 1732 and 1733. Of course it will be understood that the panel arrangement may be appropriately varied, whereby any removable panel may support one or any desired number of transmitters or receivers, the panel arrangement specified being merely illustrative.

In the calutron 1700, the four transmitters 1721 to 1724, inclusive, comprise ion generators and individually associated ion accelerating structure 1741 to 1744, inclusive, and are individually paired with the four receivers 1731 to 1734, inclusive, whereby four ion beams are transmitted through the evacuated tank space from the four transmitters to the four receivers. Each of the four ion beams is arcuate-shaped, being substantially 1233 are arranged in parallel linear arrays; whereby both the transmitters and the receivers are arranged in regular arrays, resulting in the formation of a substantially regular pattern of the four ion beams in the tank 1203. More specifically, the transmitter-receiver pairs 1222—1232 and 1224—1234 are arranged along an upper plane substantially normal to the axis of the magnetic field; while the transmitter-receiver pairs 1221—1231 and 1223—1233 are arranged along a lower plane substantially normal to the axis mentioned. Accordingly, the two upper ion beams transmitted by the transmitters 1222 and 1224 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. Similarly, the two lower ion beams transmitted by the transmittters 1221 and 1223 have a common horizontal plane of symmetry and a common vertical plane of approximate symmetry, the vertical plane of approximate symmetry being constructed normal to and substantially bisecting parallel lines drawn in the horizontal plane of symmetry between the respective transmitter-receiver pairs. The two vertical planes of approximate symmetry are coincident; and the two horizontal planes of symmetry along which the two pairs of ion beams are disposed are arranged in longitudinally spaced apart parallel relation substantially normal to the axis of the magnetic field. While the calutron 1200 is illustrated for purposes of explanation as comprising four transmitter-receiver pairs arranged along two longitudinally spaced-apart parallel planes, the actual number of transmitter-receiver pairs, as well as the number of longitudinally spaced-apart parallel planes along which they are arranged, is limited only by physical considerations.

In view of the foregoing, it will be understood that the general construction and arrangement of the calutron 1200 is quite similar to that of the calutron 700, that it embodies at least the same structural advantages, and that the principle of operation is substantially identical.

In view of the foregoing descriptions of the calutrons 900 and 1200, respectively corresponding to the calutrons 600 and 700, wherein the transmitter-receiver pairs are arranged along two longitudinally spaced-apart planes normal to the axis of the magnetic field, instead of being arranged along a single plane normal to the axis of the magnetic field, as illustrated in the calutrons 600 and 700, it will be understood that a modified form of calutron, not shown, may be readily constructed corresponding to the calutron 800, wherein the transmitter-receiver pairs are arranged along two longitudinally spaced-apart planes normal to the axis of the magnetic field, instead of being arranged along a single plane normal to the axis of the magnetic field, as illustrated in the calutron 800. Furthermore, in this modified calutron, the actual number of transmitter-receiver pairs, as well as the number of longitudinally spaced-apart parallel planes along which they are arranged, will be limited only by physical considerations. Finally, the general construction and arrangement of this modified calutron will be quite similar to that of the calutron 800, and it will embody at least the same structural advantages, and the principle of operation will be substantially identical.

Referring now more particularly to Fig. 15, there is illustrated a calutron 1500 embodying the features of the present invention and comprising a number of transmitters, of the general construction and arrangement of the transmitter 20, and magnetic field structure, the north pole of which is indicated at 1501. Also, the calutron 1500 comprises an evacuated tank 1503, substantially rectangular in plan, including wall structure provided with a number of removable panels 1511 to 1514, inclusive, supporting the transmitters 1521 and 1522 and a number of receivers 1531 and 1532. Specifically, the removable panels 1511 and 1512 respectively support the two transmitters 1521 and 1522, while the removable panels 1513 and 1514 respectively support the two receivers 1531 and 1532. Of course it will be understood that the panel arrangement may be appropriately varied, whereby any removable panel may support one or any desired number of transmitters or receivers, the panel arrangement specified being merely illustrative.

In the calutron 1500, the two transmitters 1521 and 1522 comprise ion generators and individually associated ion accelerating structures 1541 and 1542, and are individually paired with the two receivers 1531 and 1532, whereby two ion beams are transmitted through the evacuated tank space from the two transmitters to the two receivers. Each of the two ion beams is arcuate-shaped, being substantially semi-circular, the ions traveling in a clockwise direction, due to the disposition of the magnetic field, the north magnetic pole 1501 being disposed below the tank 1503; also, each of the two ion beams is disposed substantially transversely of the longitudinal axis of the magnetic field. Also, the transmitters 1521 and 1522 and the receivers 1531 and 1532 are arranged in a linear array; whereby both the transmitters and the receivers are arranged in regular array, resulting in the formation of a substantially regular pattern of the two ion beams in the tank 1503. More specifically, the two ion beams in the tank 1503 are arranged in intersecting or crossing relation, and have a common horizontal plane of symmetry and two respective vertical planes of approximate symmetry. The vertical plane of approximate symmetry individual to the ion beam transmitted by the transmitter 1521 is constructed normal to and substantially bisects a line drawn in the horizontal plane of symmetry between the transmitter-receiver pair 1521—1531; and the vertical plane of approximate symmetry individual to the ion beam transmitted by the transmitter 1522 is constructed normal to and substantially bisects a line drawn in the horizontal plane of symmetry between the transmitter receiver pair 1522—1532. Thus the two lines mentioned are collinear and the two vertical planes of approximate symmetry are substantially parallel. While the calutron 1500 is illustrated for purposes of explanation as comprising two transmitter-receiver pairs, the actual number of transmitter-receiver pairs is limited only by physical considerations.

In the calutron 1500 the distance between the transmitter 1521 and the associated receiver 1531 is substantially equal to the distance between the transmitter 1522 and the associated receiver 1532, whereby the two ion beams respectively transmitted from the two transmitters to the two associated receivers are substantially identical in every respect. This symmetry of the two ion beams is brought about by the application of substantially identical negative potentials to the two ion accelerating structures 1541 and 1542 respectively associated with the two transmitters 1521 and 1522. It will, of course, be understood that the radius of curvature of each of the ion beams is determined by the following formula:

$$r = (1/H)\sqrt{2V(m/e)}$$

In this formula, $r$ is the radius of curvature of an ion path, $H$ is the magnetic field strength through which the ion travels, $V$ is the accelerating voltage applied to the ion, $m$ is the mass of the ion, and $e$ is the charge of the ion; all taken in proper absolute units. Thus it will be readily appreciated that the radius of curvature of an ion path, and consequently of the beam of ions, is proportional to the square root of the accelerating voltage applied between the transmitter and the associated ion accelerating structure.

Of course it will be understood that the general principle of operation of the calutron 1500 is the same as that of the calutrons 10 and 600; each transmitter transmits an ion beam to the associated receiver; the respective lighter and heavier isotopes of the element treated are disposed adjacent the inner and outer boundaries of the ion beam adjacent the receiver, whereby the respective lighter and heavier isotopes of the element treated are respectively collected in the two pockets of the associated receiver; all in the manner previously explained. Furthermore, in the calutron 1500 the evacuated space in the tank 1503 is utilized even more economically than the evacuated space in the tank in the calutron 600, due to the intersecting or crossing relation of the ion beams, permitting even more compact arrangement of the transmitter-receiver pairs. In the operation of the calutron 1500, it has been found that the two ion beams transmitted in the evacuated tank space are quite stable and very satisfactory in operation, in spite of the fact that they are in intersecting or crossing relation; this discovery was entirely unexpected, and permits the previously noted compact arrangement of the transmitter-receiver pairs in the tank 1503.

Referring now more particularly to Fig. 16, there is illustrated a calutron 1600 embodying the features of the present invention and comprising a number of transmitters of the general construction and arrangement of the transmitter 20, and magnetic field structure, the north pole of which is indicated at 1601. Also, the calutron 1600 comprises an evacuated tank 1603, substantially rectangular in plan, including wall structure provided with a number of removable panels 1611 to 1618, inclusive, supporting the transmitters 1621 to 1624, inclusive, and a number of receivers 1631 to 1634, inclusive. Specifically, the removable panels 1611 and 1612 respectively support the two transmitters 1621 and 1622, while the removable panels 1613 and 1614 respectively support the two receivers 1631 and 1632. Similarly, the removable panels 1615 and 1616 respectively support the two transmitters 1623 and 1624, while the removable panels 1617 and 1618 respectively support the two receivers 1633 and 1634. Of course it will be understood that the panel arrangement may be appropriately varied, whereby any removable panel may support one or any desired number of transmitters or receivers, the panel arrangement specified being merely illustrative.

In the calutron 1600, the four transmitters 1621 to 1624, inclusive, comprise ion generators and individually associated ion accelerating structures 1641 to 1644, inclusive, and are individually paired with the four receivers 1631 to 1634, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 1601 being disposed below the tank 1603; also, each of the four ion beams is disposed substantially transversely of the longitudinal axis of the magnetic field. Also, the two transmitters 1621 and 1622 and the two receivers 1631 and 1632 are arranged in a linear array; and the two transmitters 1623 and 1624 and the two receivers 1633 and 1634 are arranged in a linear array; whereby both the transmitters and the receivers are arranged in regular arrays, resulting in the formation of a substantially regular pattern of the four ion beams in the tank 1603.

More specifically, the two ion beams transmitted by the two transmitters 1621 and 1622 are arranged in intersecting or crossing relation with respect to each other; the two ion beams transmitted by the two transmitters 1623 and 1624 are arranged in intersecting or crossing relation with respect to each other; and the pair of ion beams transmitted by the transmitters 1621 and 1622 are arranged in mutually intersecting or crossing relation with respect to the pair of ion beams transmitted by the transmitters 1623 and 1624. Further, the four ion beams in the tank 1603 have a common horizontal plane of symmetry; the two ion beams transmitted by the two transmitters 1621 and 1624 have a common vertical plane of approximate symmetry; and the two ion beams transmitted by the two transmitters 1622 and 1623 have a common vertical plane of approximate symmetry. The vertical plane of approximate symmetry individual to the ion beams transmitted by the two transmitters 1621 and 1624 is constructed normal to and substantially bisects two substantially parallel lines drawn in the horizontal plane of symmetry between the respective transmitter-receiver pairs 1621—1631 and 1624—1634; similarly, the vertical plane of approximate symmetry individual to the ion beams transmitted by the two transmitters 1622 and 1623 is constructed normal to and substantially bisects two substantially parallel lines drawn in the horizontal plane of symmetry between the respective transmitter-receiver pairs 1622—1632 and 1623—1633. Thus the two vertical planes of approximate symmetry are substantially parallel. While the calutron 1600 is illustrated for purposes of explanation as comprising four transmitter-receiver pairs, the actual number of transmitter-receiver pairs is limited only by physical considerations.

In view of the foregoing, it will be understood that the general construction and arrangement of the calutron 1600 is quite similar to that of the calutron 1500, that it embodies at least the same structural advantages, and that the principle of operation is substantially identical.

Referring now more particularly to Fig. 17, there is illustrated a calutron 1700 embodying the features of the present invention and comprising a number of transmitters of the general construction and arrangement of the transmitter 20, and magnetic field structure, the north pole of which is indicated at 1701. Also, the calutron 1700 comprises an evacuated tank 1703, substantially circular in plan, including wall structure provided with a number of removable panels 1711 to 1718, inclusive, supporting the transmitters 1721 to 1724, inclusive, and a number of receivers 1731 to 1734, inclusive. Specifically, the removable panels 1711, 1713, 1715 and 1717 respectively support the transmitters 1721, 1722, 1723 and 1724, while the removable panels 1712, 1714, 1716 and 1718 respectively support the receivers 1734, 1731, 1732 and 1733. Of course it will be understood that the panel arrangement may be appropriately varied, whereby any removable panel may support one or any desired number of transmitters or receivers, the panel arrangement specified being merely illustrative.

In the calutron 1700, the four transmitters 1721 to 1724, inclusive, comprise ion generators and individually associated ion accelerating structure 1741 to 1744, inclusive, and are individually paired with the four receivers 1731 to 1734, inclusive, whereby four ion beams are transmitted through the evacuated tank space from the four transmitters to the four receivers. Each of the four ion beams is arcuate-shaped, being substantially semi-circular, the ions traveling in a clockwise direction, due to the disposition of the magnetic field, the north magnetic pole 1701 being disposed below the tank 1703; also, each of the four ion beams is disposed substantially transversely of the longitudinal axis of the magnetic field. Also, the transmitters 1721 to 1724, inclusive, are arranged in a circular array; the receivers 1731 to 1734, inclusive, are arranged in a circular array; whereby both the transmitters and the receivers are arranged in regular arrays, resulting in the formation of a substantially regular pattern of the four ion beams in the tank 1703. More specifically, the four ion beams in the tank 1703 are arranged in mutually intersecting or crossing relation, and are disposed in a four-fold symmetrical arrangement about the center of the tank 1703. While the calutron 1700 is illustrated for purposes of explanation as comprising four transmitter-receiver pairs, the actual number of transmitter-receiver pairs is limited only by physical considerations.

In view of the foregoing, it will be understood that the general construction and arrangement of the calutron 1700 is quite similar to that of the calutron 1500, that receivers. Each of the four ion beams is arcuate-shaped, being substantially semi-circular, the ions traveling in a clockwise direction, due to the disposition of the magnetic field, the north magnetic pole 2301 being disposed below the tank 2302; also, each of the four ion beams is disposed substantially transversely of the longitudinal axis of the magnetic field. Also, the two transmitters 2321 and 2322 and the receiver 2331, as well as the two transmitters 2323 and 2324 and the receiver 2332, are arranged in linear arrays; whereby the transmitters and receivers are arranged in regular arrays, resulting in the formation of a substantially regular pattern of the four ion beams in the tank 2302. More specifically, the two ion beams transmitted by the two transmitters 2321 and 2322 through the tank 2303 are symmetrical about two substantially parallel lines normal to a line drawn through the transmitters mentioned and the receiver 2331; similarly, the two ion beams transmitted by the two transmitters 2323 and 2324 through the tank 2303 are symmetrical about two substantially parallel lines normal to a line drawn through the transmitters mentioned and the receiver 2332. Thus, the two ion beams transmitted by the transmitters 2321 and 2322 constitute a pair focused upon the receiver 2331, and the two ion beams transmitted by the transmitters 2323 and 2324 constitute a pair focused upon the receiver 2332. The two ion beams transmitted by the transmitters 2321 and 2323 are of larger radii than the two corresponding ion beams transmitted by the transmitters 2322 and 2324.

The projection of the two ion beams by the two transmitters 2321 and 2323, of larger radii with respect to the two ion beams projected by the two transmitters 2322 and 2324, is brought about by the application of higher accelerating electrode supply voltages between the two ion generators and the respective individually associated ion accelerating structures 2341 and 2343 in the two transmitters 2321 and 2323 than between the two ion generators and the respective individually associated ion accelerating structures 2342 and 2344 in the two transmitters 2322 and 2324, in the manner previously explained. While the calutron 2300 is illustrated for purposes of explanation as comprising four transmitters transmitting four ion beams focused upon two receivers, the actual number of transmitters focused upon a single receiver as well as the actual number of receivers is limited only by physical considerations.

It is noted that in the calutron 2300 the two ion beams transmitted by the two transmitters 2321 and 2322, as well as the two ion beams transmitted by the two transmitters 2323 and 2324 to the associated receiver 2332, may be arranged in a single plane substantially normal to the magnetic field; in which case the four ion beams are disposed in mutually intersecting or crossing relation. On the other hand, the two ion beams transmitted by the two transmitters 2321 and 2322 to the associated receiver 2331 may be arranged in an upper plane normal to the longitudinal axis of the magnetic field, while the two ion beams transmitted by the two transmitters 2323 and 2324 to the associated receiver 2332 may be arranged in a lower plane normal to the longitudinal axis mentioned; in which case the two beams transmitted by the two transmitters 2321 and 2322 do not intersect or cross the two beams transmitted by the two transmitters 2323 and 2324.

In view of the foregoing, it will be understood that the general construction and arrangement of the calutron 2300 is quite similar to that of the calutron 2200, that it embodies at least the same structural advantages, and that the principle of operation is substantially identical.

Referring now more particularly to Figs. 24 to 28, inclusive, there is illustrated an ion transmitter unit 2400 arranged to transmit three beams of ions and embodying the features of the present invention; which transmitter unit is adapted to be arranged in the magnetic field between the pole pieces of a calutron in a manner similar to that explained in conjunction with the transmitter unit 20 in the calutron 10. The transmitter unit 2400 comprises a charge receptacle 2401 and an arc-block 2402. The charge receptacle 2401 comprises wall structure including a removable cover 2403 defining an upstanding cavity 2404 therein, that is adapted to receive a removable charge bottle 2405 containing a charge 2406 which is to be vaporized. The arc-block 2402 comprises wall structure defining an upstanding distributing chamber 2407 and three upstanding arc chambers 2408, 2409 and 2410 therein, the cavity 2404 communicating with the distributing chamber 2407 through a tubular member 2411, supported by the wall structure of the charge receptacle 2401 and the wall structure of the arc-block 2402. The wall structure of the charge receptacle 2401 has two upstanding cavities 2412 formed therein, in which two elements of an electric heater 2413 are arranged. Preferably, each element of the electric heater 2413 comprises a coil of resistance wire wound upon a supporting insulator, as indicated, whereby each element of the electric heater 2413 may be independently placed in and removed from the associated cavity 2412. Thus, the charge receptacle 2401, and consequently the charge bottle 2405, may be appropriately heated in order to vaporize the charge 2406 contained in the charge bottle 2405. Similarly, the arc-block 2402 has two upstanding cavities 2414 formed therein, in which two electric heating elements 2415 are arranged. Preferably, each of the electric heating elements 2415 comprises a coil of resistance wire wound upon a supporting insulator, as indicated, whereby each of the electric heating elements 2415 may be independently placed in and removed from the associated cavity 2414. Thus, the arc-block 2402 and more particularly the distributing chamber 2407 therein may be heated in order to prevent condensation of the contained vapor, as explained more fully hereinafter.

More particularly, the wall structure of the charge receptacle 2401 is formed of copper or brass; and the wall structure of the arc-block 2402 is formed of copper or brass and comprises two primary members 2416 and 2417. The distributing chamber 2407 and the cavities 2414 are formed in the member 2416; while the arc chambers 2408, 2409 and 2410 are formed in the member 2417 and arranged in laterally spaced-apart relation. Three series of longitudinally spaced-apart openings 2418 are formed in the wall of the member 2417 and communicate between the arc chambers 2408, 2409 and 2410 and laterally extending manifold passages 2419, also formed in the wall of the member 2417, the manifold passages 2419 communicating with the distributing chamber 2407. The transmitter unit 2400 is supported by two rearwardly extending arms 2420, which are secured to the member 2417.

Four upstanding strips 2421, 2422, 2423 and 2424, formed of tungsten or the like, are secured to the face of the member 2417 in cooperating relation with the arc chambers 2408, 2409 and 2410. More particularly, the two strips 2421 and 2422 comprise a portion of the wall structure of the arc chamber 2408 and are arranged in laterally spaced-apart relation to define an upstanding slot therebetween communicating with this arc chamber; the two strips 2422 and 2423 comprise a portion of the arc chamber 2409 and are arranged in laterally spaced-apart relation to define an upstanding slot therebetween communicating with this arc chamber; and the two strips 2423 and 2424 comprise a portion of the arc chamber 2410 and are arranged in laterally spaced-apart relation to define an upstanding slot therebetween communicating with this arc chamber. Also, four upstanding strips 2425, 2426, 2427 and 2428, formed of tungsten or the like, are secured to the member 2417, respectively adjacent the strips 2421, 2422, 2423 and 2424, and spaced a small distance forwardly with respect thereto. More particularly, the strips 2425 and 2426 define an upstanding slot therebetween communicating with the arc chamber 2408; the strips 2426 and 2427 define an upstanding slot therebetween communicating with the arc chamber 2409; and the strips 2427 and 2428 define an upstanding slot therebetween communicating with the arc chamber 2410. Thus, the slot defined between the strips 2421 and 2422 and the slot defined between the strips 2425 and 2426 constitute an upstanding composite slot 2429, formed in the front wall of the arc-block 2402 and communicating with the arc chamber 2408; the slot defined between the strips 2422 and 2423 and the slot defined between the strips 2426 and 2427 constitute an upstanding composite slot 2430, formed in the front wall of the arc-block 2402 and communicating with the arc chamber 2409; and the slot defined between the strips 2423 and 2424 and the slot defined between the strips 2427 and 2428 constitute an upstanding composite slot 2431, formed in the front wall of the arc-block 2402 and communicating with the arc chamber 2410.

Three cathode structures 2432, 2433 and 2434 are supported over the arc-block 2402 and respectively carry three filamentary cathodes 2435, 2436 and 2437 in cooperating relation with respect to the three arc chambers 2408, 2409 and 2410. The opposite ends of each of the filamentary cathodes are removably clamped in place by two terminals carried by the associated cathode structure, and the two terminals mentioned are connected to a source of filament supply. The central portions of the filamentary cathodes 2435, 2436 and 2437, respectively, overhang the top wall of the arc-block 2402; and a collimating electrode 2438 is secured to the top wall of the arc-block 2402, the collimating electrode 2438 having three laterally spaced-apart and transversely extending slots formed therein and respectively communicating with the arc chambers 2408, 2409 and 2410, the center transverse slot formed in the collimating electrode 2438 and cooperating with the filamentary cathode 2436 being illustrated at 2439 in Fig. 25. More particularly, the filamentary cathode 2435 is spaced a short distance above the collimating electrode 2438, the central portion of the filamentary cathode 2435 being arranged in alignment with the corresponding transverse slot formed in the collimating electrode 2438 and communicating with the arc chamber 2410; the filamentary cathode 2436 is spaced a short distance above the collimating electrode 2438, the central portion of the filamentary cathode 2436 being arranged in alignment with the corresponding transverse slot 2439 formed in the collimating electrode 2438 and communicating with the arc chamber 2409; and the filamentary cathode 2437 is spaced a short distance above the collimating electrode 2438, the central portion of the filamentary cathode 2437 being arranged in alignment with the corresponding transverse slot formed in the collimating electrode 2438 and communicating with the arc chamber 2408.

An anode 2440 is secured to the bottom wall of the arc-block 2402, adjacent the lower end of the arc chambers 2408, 2409 and 2410 and in alignment with the central portions of the filamentary cathodes 2435, 2436 and 2437 and the three transverse slots formed in the collimating electrode 2438. The negative terminal of an arc supply is connected to the filamentary cathodes 2435, 2436 and 2437; and the positive terminal of the arc supply is connected to the arc-block 2402, the anode 2440 and the collimating electrode 2438 being connected together by the arc-block 2402 and consequently to the positive terminal of the arc supply.

Also, ion accelerating structure 2450 is associated with the arc-block 2402 and comprises four upstanding laterally spaced-apart strips 2451 to 2454, inclusive, supported by two laterally extending members 2455 and 2456, the strips 2451 to 2454, inclusive, being directly connected to the members 2455 and 2456 in any suitable manner. The ion accelerating structure 2450 is disposed forwardly of the arc-block 2402; the two strips 2451 and 2452 carry two electrodes 2457, formed of tungsten or the like, arranged in laterally spaced-apart relation to define an upstanding slit 2458 therebetween, arranged in alignment with the slot 2429 formed in the front wall of the arc-block 2402 and communicating with the arc chamber 2408; the two strips 2452 and 2453 carry two electrodes 2459, formed of tungsten or the like, arranged in laterally spaced-apart relation to define an upstanding slit 2460 therebetween, arranged in alignment with the slot 2430 formed in the front wall of the arc-block 2402 and communicating with the arc chamber 2409; and the two strips 2453 and 2454 carry two electrodes 2461, formed of tungsten or the like, arranged in laterally spaced-apart relation to define an upstanding slit 2462 therebetween, arranged in alignment with the slot 2431 formed in the front wall of the arc-block 2402 and communicating with the arc chamber 2410. The ion accelerating structure 2450, together with the arc-block 2402, is adapted to be supported by the removable end wall of a calutron, in the manner previously noted; and the positive and negative terminals of an accelerating electrode supply are respectively connected to the arc-block 2402 and the ion accelerating structure 2450. Finally, three upstanding semi-circular baffle plates 2463, 2464 and 2465, formed of quartz or the like, are respectively arranged in the arc chambers 2408, 2409 and 2410, each of the baffle plates mentioned having a series of longitudinally spaced-apart openings formed therein for a purpose more fully explained hereinafter.

Referring now more particularly to Fig. 29, a wiring diagram for the transmitter unit 2400 is illustrated; wherein the three filamentary cathodes 2435, 2436 and 2437 are connected to three pairs of terminals carried by an insulating block 2901; the collimating electrode 2438 and the anode 2440 are both connected to the arc-block 2402, which in turn is connected to another terminal carried by the insulating block 2901; the three pairs of electrodes 2457, 2459 and 2461 are connected to the ion accelerating structure 2450, which in turn is connected to a further terminal carried by the insulating block 2901. A suitable source of filament supply is connected to a first pair of terminals carried by an insulating block 2902; a suitable source of arc supply is connected to a second pair of terminals carried by the insulating block 2902; and a suitable source of accelerating electrode supply is connected to a third pair of terminals carried by the insulating block 2902, the positive and negative terminals of the accelerating electrode supply being respectively grounded and ungrounded. The positive and negative terminals of the filament supply carried by the insulating block 2902 are respectively connected to each pair of terminals carried by the insulating block 2901 to which the ends of the filamentary cathodes 2435, 2436 and 2437 are connected, whereby the filamentary cathodes mentioned are connected in multiple across the source of filament supply. The positive terminal of the source of arc supply carried by the insulating block 2902 is connected to the terminal carried by the insulating block 2901 to which the arc-block 2402 is connected; and the negative terminal of the source of arc supply carried by the insulating block 2902 is connected to the negative terminal of the source of filament supply carried by the insulating block 2902; whereby the arc supply voltage is impressed between each of the filamentary cathodes 2435, 2436 and 2437 and the arc-block 2402. Finally, the ungrounded positive terminal of the source of accelerating electrode supply carried by the insulating block 2902 is connected to the terminal carried by the insulating block 2901 to which the arc-block 2402 is connected; and the grounded negative terminal of the source of accelerating electrode supply carried by the insulating block 2902 is connected to the terminal carried by the insulating block 2901 to which the ion accelerating structure 2450 is connected; whereby the accelerating electrode supply voltage is impressed between the arc-block 2402 and each of the pairs of electrodes 2457, 2459 and 2461 carried by the ion accelerating structure 2450.

Considering now the detailed operation of the ion transmitter unit 2400, when the electric circuit for the heater 2413 is completed the charge receptacle 2401 and consequently the charge bottle 2405 are heated, whereby the charge 2406 is vaporized, filling the cavity in the charge bottle 2405. The vapor passes through the tubular member 2411 into the distributing chamber 2407, whereby this chamber is filled with the vapor. The vapor is distributed in the distributing chamber 2407 and passes through the manifold passages 2419 and communicating openings 2418 formed in the wall of the member 2417, into the rear parts of the arc chambers 2408, 2409 and 2410. The vapor then passes through the openings formed in the baffle plates 2463, 2464 and 2465, into the front parts of the arc chambers 2408, 2409 and 2410, whereby these parts of the arc chambers mentioned are filled with the vapor. More particularly, each of the arc chambers 2408, 2409 and 2410 is thoroughly and substantially uniformly filled with the vapor to be ionized, due to the arrangement of the distributing chamber 2407, the manifold passages 2419, the communicating openings 2418 and the associated baffle plate.

When the filament supply circuit is completed, the filamentary cathodes 2435, 2436 and 2437 are heated and rendered electron emissive; and when the arc supply circuit is completed between the filamentary cathodes 2435, 2436 and 2437 and the arc-block 2402, electrons are projected from the central portion of each of the filamentary cathodes toward the collimating electrode 2438. More particularly, some of the electrons from the central portion of each of the filamentary cathodes 2435, 2436 and 2437 pass through the three transverse slots formed in the collimating electrode 2438, into the associated arc chambers 2408, 2409 and 2410, and proceed toward the anode 2440. Accordingly, the collimating electrode 2438 causes a stream of electrons having a ribbon-like configuration to be projected through each of the arc chambers 2408, 2409 and 2410, whereby the vapor in each of the arc chambers mentioned is ionized.

When the accelerating electrode supply circuit is completed between the arc-block 2402 and the ion accelerating structure 2450, the positive ions produced in the arc chamber 2408 are drawn through the upstanding slot 2429 formed in the front wall of the arc-block 2402, to form a beam of positive ions having an upstanding substantially ribbon-like configuration proceeding through the slit 2458 between the electrodes 2457; which beam of positive ions is projected through the evacuated tank space toward the cooperating collector block or receiver unit in the calutron, in the manner previously explained. Also, when the accelerating electrode supply circuit is completed between the arc-block 2402 and the ion accelerating structure 2450, the positive ions produced in the arc chamber 2409 are drawn through the upstanding slot 2430 formed in the front wall of the arc-block 2402, to form a beam of positive ions having an upstanding substantially ribbon-like configuration proceeding through the slit 2460 between the electrodes 2459; which beam of positive ions is projected through the evacuated tank space toward the cooperating collector block or receiver unit in the calutron, in the manner previously explained. Finally, when the accelerating electrode supply circuit is completed between the arc-block 2402 and the ion accelerating structure 2450, the positive ions produced in the arc chamber 2410 are drawn through the upstanding slot 2431 formed in the front wall of the arc-block 2402, to form a beam of positive ions having an upstanding substantially ribbon-like configuration proceeding through the slit 2462 between the electrodes 2461; which beam of positive ions is projected through the evacuated tank space toward the cooperating collector block or receiver until in the calutron, in the manner previously explained.

Accordingly, it will be understood that the arc-block 2402 and the three sets of associated electrodes constitute three ion generators or gas-ionizing devices operative to produce ions from the vapor of polyisotopic material supplied thereto through the commonly associated distributing chamber 2407 from the single charge bottle 2405; which ion generators, in conjunction with the associated ion accelerating structure 2450, constitute the ion transmitter unit 2400. Hence, the transmitter unit 2400 comprises three individual ion beam transmitters, each arranged to transmit a beam of ions through the evacuated space in the tank of a calutron to associated ion collecting apparatus in the form of one or more ion receiver units. In such a calutron, the transmitter unit 2400 is supported by one of the removable end walls of the tank and the receiver or receiver units are supported by the other removable end wall of the tank, in the manner previously explained.

Referring now more particularly to Fig. 30, there is illustrated a calutron 3000, embodying the features of the present invention and comprising a transmitter unit 3001, of the general construction and arrangement of the source unit 2400, and magnetic field structure, the north pole of which is indicated at 3002. Also, the calutron 3000 comprises an evacuated tank 3003, substantially rectangular in plan, including wall structure provided with a number of removable panels 3011 and 3012, respectively, supporting the source unit 3001, and three receivers 3031 to 3033, inclusive, the transmitter unit 3001 comprising three individual transmitters 3021 to 3023, inclusive. Of course it will be understood that the panel arrangement may be appropriately varied, whereby any removable panel may support the transmitter unit 3001 and any desired number of receivers, the panel arrangement specified being merely illustrative.

In the calutron 3000, transmitter unit 3001 comprises ion accelerating structure including the three electrodes 3041 to 3043, inclusive, individually associated with the three individual transmitters 3021 to 3023, inslusive, whereby three ion beams are transmitted through the evacuated tank space from the three individual transmitters to the three receivers. Each of the three ion beams is arcuate-shaped, being substantially semi-circular, the ions traveling in a clockwise direction, due to the disposition of the magnetic field, the north magnetic pole 3002 being disposed below the tank 3003. Also, the individual transmitters 3021 to 3023, inclusive, and the receivers 3031 to 3033, inclusive, are arranged in a linear array, resulting in the formation of a substantially regular patern of the three ion beams in the tank 3003. More specifically, the three ion beams in the tank 3003 are arranged in intersecting or crossing relation and are symmetrical about three substantially parallel lines normal to a line drawn through the individual transmitters 3021 to 3023, inclusive, and the receivers 3031 to 3033, inclusive. While the calutron 3000 is illustrated for purposes of explanation as comprising a transmitter unit 3001 including three individual transmitters, the actual number of individual transmitters is limited only by physical considerations.

In view of the foregoing, it will be understood that the general construction and arrangement of the calutron 3000 is quite similar to that of the calutron 1500, that it embodies at least the same structural advantages, and that the principle of operation is substantially identical.

While only the single calutron 3000, embodying a source unit of the general construction and arrangement of the transmitter unit 2400, and corresponding to the calutron 1500, has been illustrated, it will be understood that other calutron geometries are contemplated. By way of example, it is noted that in substantially any of the calutrons illustrated, wherein a plurality of transmitter units of the general construction and arrangement of the transmitter unit 20 is employed, there may be substituted a transmitter unit of the general construction and arrangement of the transmitter unit 2400, the latter transmitter unit comprising three individual transmitters and replacing three of the transmitter units each comprising only one individual transmitter.

In view of the foregoing, it is apparent that there has been provided an improved calutron of the multiple ion beam type, as well as an improved transmitter unit of the multiple transmitter type.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A calutron comprising a substantially fluid-tight tank, means for evacuating said tank, means for establishing a magnetic field along a given axis through said tank, means disposed in said tank for generating ions of a polyisotopic material and for projecting therefrom a plurality of separate ion beams along arcuate and intersecting paths substantially transversely of said given axis, whereby the ions of different isotopes of the material in said ion beams are subjected to a segregating influence, and means disposed in said tank for receiving said ion beams and for collecting predetermined portions thereof, the collected portions of said ion beams containing a given isotope of the material.

2. A calutron comprising a substantially fluid-tight tank, means for evacuating said tank, means for establishing a magnetic field along a given axis through said tank, means disposed in said tank for generating ions of a polyisotopic material and for projecting therefrom a plurality of separate ion beams along arcuate and crossing paths substantially transversely of said given axis, whereby the ions of different isotopes of the material in said ion beam are subjected to a segregating influence, and means disposed in said tank for receiving said ion beams and for collecting predetermined portions thereof, the collected portions of said ion beams containing a given isotope of the material.

3. A calutron comprising a substantially fluid-tight tank, means for evacuating said tank, means for establishing a magnetic field along a given axis through said tank, a plurality of ion generators disposed in said tank and arranged in linear spaced-apart relation, each of said ion generators being operative to generate ions of a polyisotopic material, means for projecting from said ion generators a corresponding plurality of ion beams along arcuate and intersecting paths substantially transversely of said given axis, whereby the ions of different isotopes of the material in said ion beams are subjected to a segregating influence, and means disposed in said tank for receiving said ion beams and for collecting predetermined portions thereof, the collected portions of said ion beams containing a given isotope of the material.

4. A calutron comprising a substantially fluid-tight tank, means for evacuating said tank, means for establishing a magnetic field along a given axis through said tank, a plurality of ion generators disposed in said tank and arranged in linear spaced-apart relation, each of said ion generators being operative to generate ions of a polyisotopic material, means for projecting from said ion generators a corresponding plurality of ion beams along arcuate and intersecting paths of substantially the same radii and substantially transversely of said given axis, whereby the ions of different isotopes of the material in said ion beams are subjected to a segregating influence, and means disposed in said tank for receiving said ion beams and for collecting predetermined portions thereof, the collected portions of said ion beams containing a given isotope of the material.

5. A calutron comprising a substantially fluid-tight tank, means for evacuating said tank, means for establishing a magnetic field along a given axis through said tank, a plurality of electrically connected ion generators disposed in said tank and arranged in linear spaced-apart relation, each of said ion generators being operative to generate ions of a polyisotopic material, structure carrying a plurality of electrically connected accelerating electrodes respectively associated with said ion generators, means impressing a potential between said ion generators and said accelerating electrodes for projecting from said ion generators a corresponding plurality of ion beams along arcuate and intersecting paths substantially transversely of said given axis, whereby the ions of different isotopes of the material in said ion beams are subjected to a segregating influence, and means disposed in said tank for receiving said ion beams and for collecting predetermined portions thereof, the collected portions of said ion beams containing a given isotope of the material.

6. A calutron comprising a substantially fluid-tight tank, means for evacuating said tank, means for establishing a magnetic field along a given axis through said tank, a plurality of ion generators disposed in said tank and arranged in spaced-apart relation, each of said ion generators being operative to generate ions of a polyisotopic material, means for projecting from said ion generators a corresponding plurality of ion beams along arcuate and intersecting paths of different radii and substantially transversely of said given axis, whereby the ions of different isotopes of the material in said ion beams are subjected to a segregating influence, and means disposed in said tank for receiving said ion beams substantially at the point of intersection thereof and for collecting predetermined portions thereof, the collected portions of said ion beams containing a given isotope of the material.

7. A calutron comprising a substantially fluid-tight tank, means for evacuating said tank, means for establishing a magnetic field along a given axis through said tank, a plurality of ion generators disposed in said tank and arranged in spaced-apart relation, each of said ion generators being operative to generate ions of a polyisotopic material, means for projecting from said ion generators a corresponding plurality of ion beams at different velocities and substantially transversely of said given axis, whereby said ion beams describe arcuate and intersecting paths of different radii and the ions of different isotopes of the material therein are subjected to a segregating influence, and means disposed in said tank for receiving said ion beams substantially at the point of intersection thereof and for collecting predetermined portions thereof, the collected portions of said ion beams containing a given isotope of the material.

8. A calutron comprising a substantially fluid-tight tank, means for evacuating said tank, means for establishing a magnetic field along a given axis through said tank, a plurality of ion generators disposed in said tank and arranged in spaced-apart relation, each of said ion generators being operative to generate ions of a polyisotopic material, means for projecting from said ion generators a corresponding plurality of ion beams along arcuate paths of different radii intersecting substantially at the 180° position and substantially transversely of said given axis, whereby the ions of different isotopes of the material in said ion beams are subjected to a segregating influence, and means disposed in said tank for receiving said ion beams substantially at the 180° position of intersection thereof and for collecting predetermined portions thereof, the collected portions of said ion beams containing a given isotope of the material.

9. In a calutron comprising a substantially fluid-tight tank, means for evacuating said tank, and means for establishing a magnetic field along a given axis through said tank, an ion transmitter unit disposed in said tank and including means for generating ions of a polyisotopic material and for projecting therefrom a plurality of separate ion beams along arcuate and intersecting paths substantially transversely of said given axis, whereby the ions of different isotopes of the material in said ion beams are subjected to a segregating influence.

(References on following page)

References Cited in the file of this patent

UNITED STATES PATENTS

| | | |
|---|---|---|
| 1,948,384 | Lawrence | Feb. 20, 1934 |
| 2,009,457 | Sloan | July 30, 1935 |
| 2,219,033 | Kuhn | Oct. 22, 1940 |
| 2,221,467 | Bleakney | Nov. 12, 1940 |
| 2,258,149 | Schutze | Oct. 7, 1941 |
| 2,341,551 | Hoover | Feb. 15, 1944 |
| 2,373,151 | Taylor | Apr. 10, 1945 |
| 2,393,650 | Metcalf | Jan. 29, 1946 |

OTHER REFERENCES

"Physical Review," vol. XI, No. 4 (1918), pages 316–325.

Smythe and Hemmendinger, Physical Review, vol. 51, February 1, 1937, pages 178–182.